US008428395B2

(12) United States Patent
Matsuda

(10) Patent No.: US 8,428,395 B2
(45) Date of Patent: Apr. 23, 2013

(54) IMAGE PROCESSING APPARATUS, IMAGE DISPLAY APPARATUS, IMAGE FORMING APPARATUS, IMAGE PROCESSING METHOD AND STORAGE MEDIUM

(75) Inventor: Toyohisa Matsuda, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 1140 days.

(21) Appl. No.: 12/316,185

(22) Filed: Dec. 10, 2008

(65) Prior Publication Data
US 2009/0148059 A1   Jun. 11, 2009

(30) Foreign Application Priority Data

Dec. 10, 2007  (JP) .................................. 2007-318824

(51) Int. Cl.
*G06K 9/32*   (2006.01)
*G06K 9/36*   (2006.01)
*G06K 9/46*   (2006.01)
*G06K 9/00*   (2006.01)
*H04N 11/02*   (2006.01)
*H04N 11/04*   (2006.01)

(52) U.S. Cl.
USPC .......... 382/299; 382/298; 382/232; 382/246; 382/248; 382/251; 375/240.01

(58) Field of Classification Search .................. None
See application file for complete search history.

(56) References Cited

U.S. PATENT DOCUMENTS

| | | | | |
|---|---|---|---|---|
| 5,300,949 A | * | 4/1994 | Rodriquez et al. ............ 345/549 |
| 5,384,868 A | * | 1/1995 | Maeda et al. ................. 382/240 |
| 5,414,527 A | * | 5/1995 | Koshi et al. .................... 382/239 |
| 5,485,557 A | * | 1/1996 | Sato et al. ....................... 345/634 |
| 5,692,012 A | * | 11/1997 | Virtamo et al. ................ 375/240 |
| 5,812,146 A | * | 9/1998 | Sato et al. ....................... 345/501 |
| 5,878,161 A | | 3/1999 | Ishida et al. |
| 6,181,825 B1 | * | 1/2001 | Ragland et al. ................ 382/239 |
| 8,150,177 B2 | * | 4/2012 | Mitsui ........................... 382/232 |
| 2001/0046262 A1 | * | 11/2001 | Freda ........................ 375/240.03 |

(Continued)

FOREIGN PATENT DOCUMENTS

| | | |
|---|---|---|
| CN | 1329435 A | 1/2002 |
| JP | 5-174140 | 7/1993 |

OTHER PUBLICATIONS

Codebook Edge Detection, G.F. McLean, Department of Mechanical Engineering, University of Victoria, Canada; CVGIP: Graphical Models and Image Processing; vol. 55, No. 1, January, pp. 48-57, 1993.

*Primary Examiner* — Randolph I Chu
(74) *Attorney, Agent, or Firm* — Edwards Wildman Palmer LLP; David G. Conlin; David A. Tucker

(57) ABSTRACT

With the use of a vector quantization technique, an index image, which is obtained by replacing an image on a block-by-block basis, each block consisting of a predetermined number of pixels, with any of a plurality of different pixel patterns and representing the pixel patterns by index values of the respective pixel patterns, is decoded by referring to a code book containing the pixel patterns and the index values of the pixel patterns in association with each other. When decoding an index image on the block-by-block basis into pixel patterns corresponding to the index values, the pixel pattern of each block is scaled, and additionally pixels near a contour in the pixel pattern after scaling are redrawn based on contour vector information corresponding to the pixel pattern.

6 Claims, 25 Drawing Sheets

U.S. PATENT DOCUMENTS

2002/0012464 A1    1/2002   Han et al.
2002/0012471 A1*   1/2002   Nayyar .................... 382/239
2004/0017853 A1*   1/2004   Garrido et al. ........ 375/240.16
2007/0257934 A1*   11/2007  Doermann et al. ........... 345/606
2011/0298974 A1*   12/2011  Garrido et al. ............... 348/441

* cited by examiner

F I G. 4
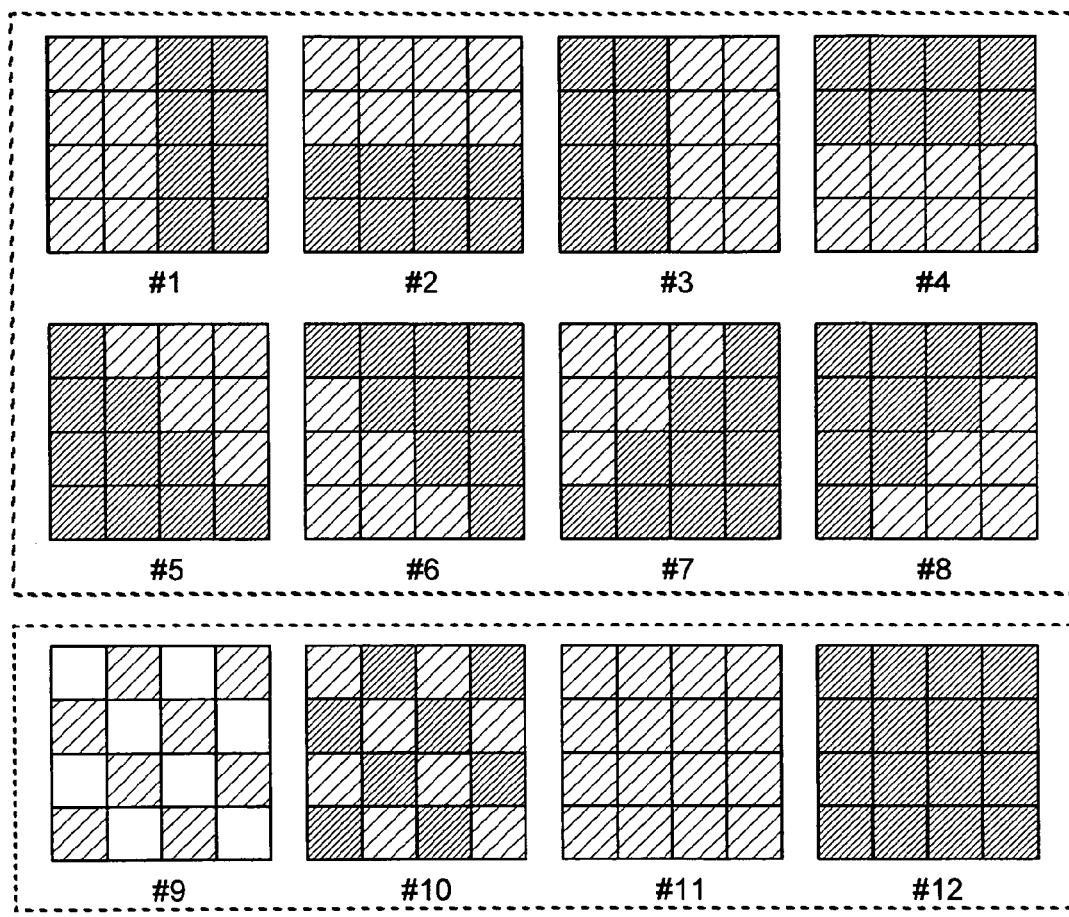

F I G. 7
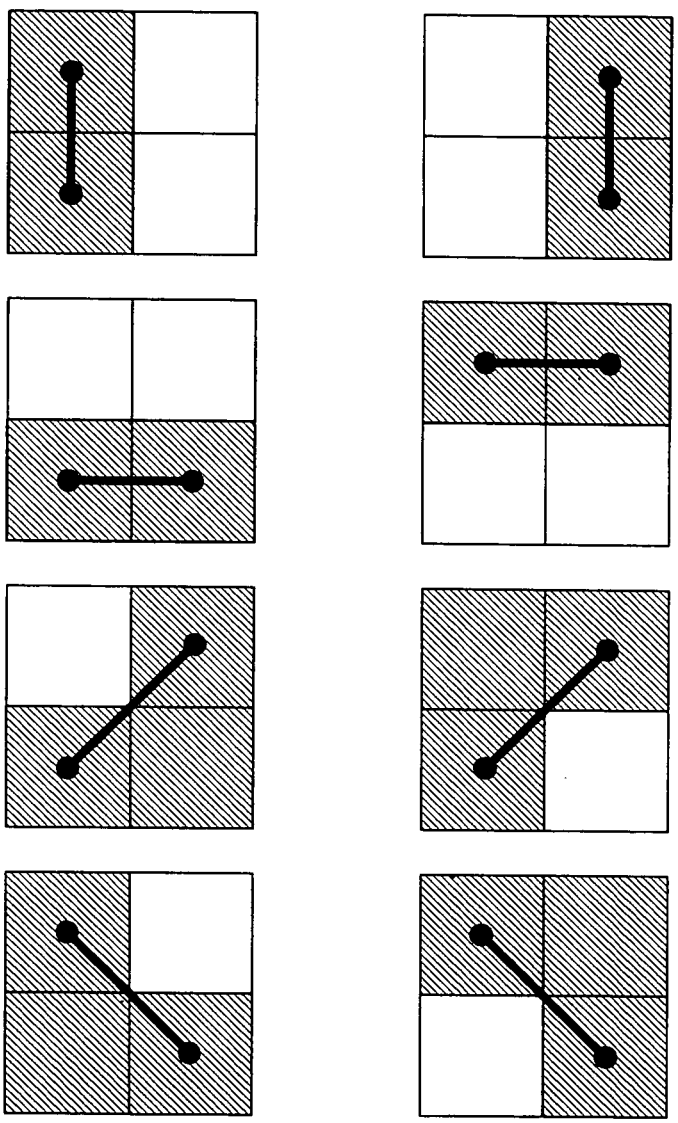

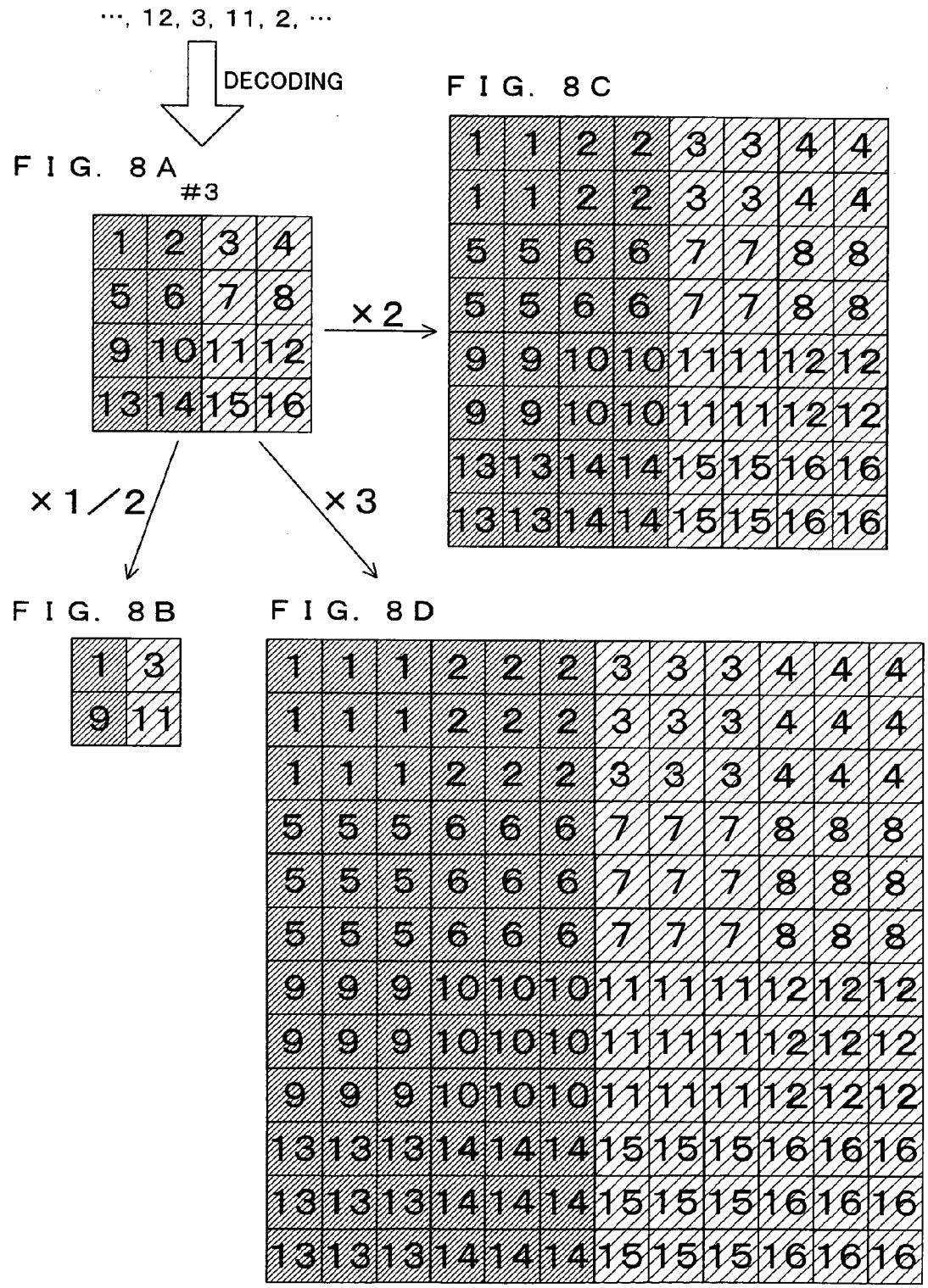

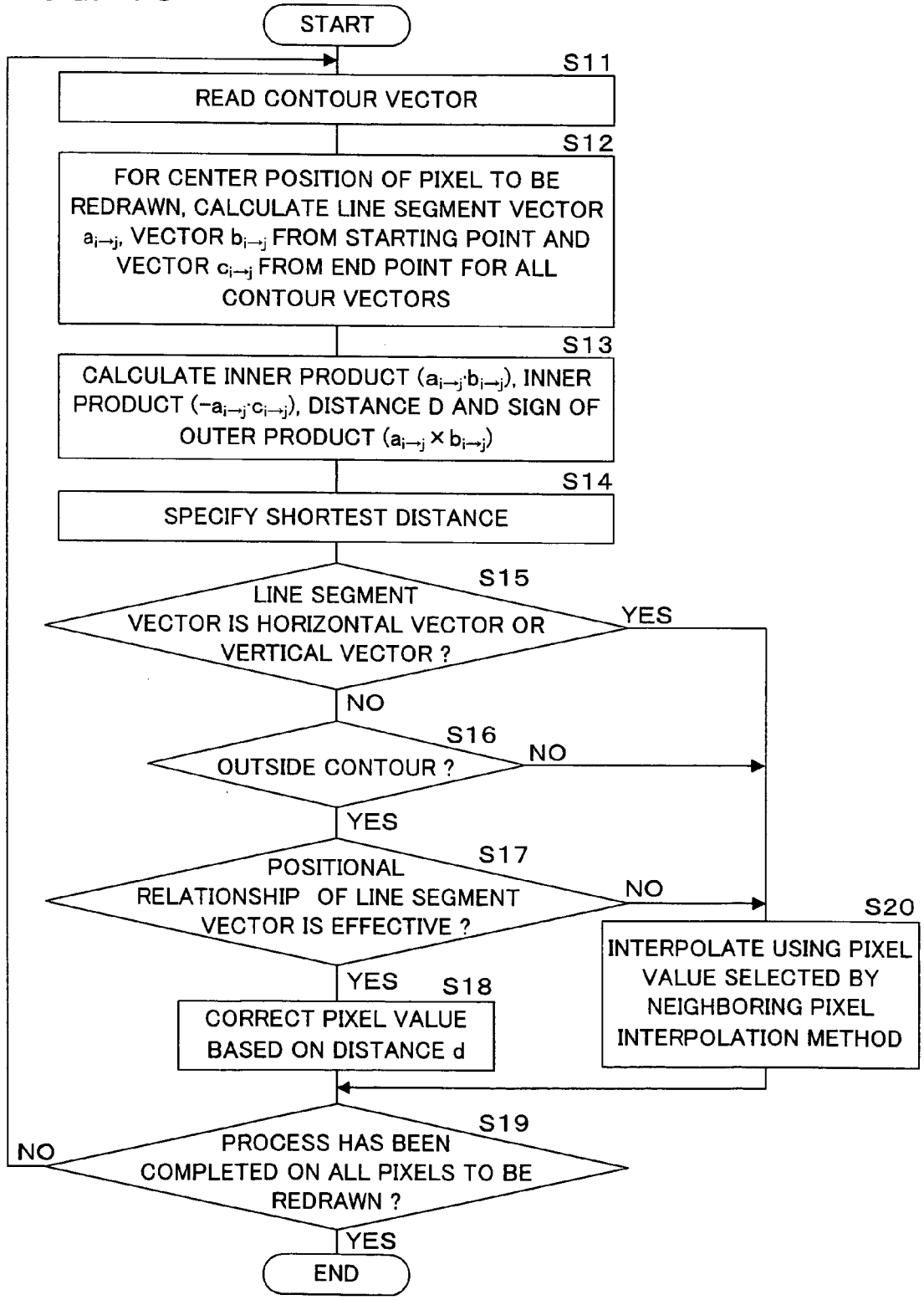

PIXEL TO BE REDRAWN

PIXEL TO BE REDRAWN

F I G. 20A
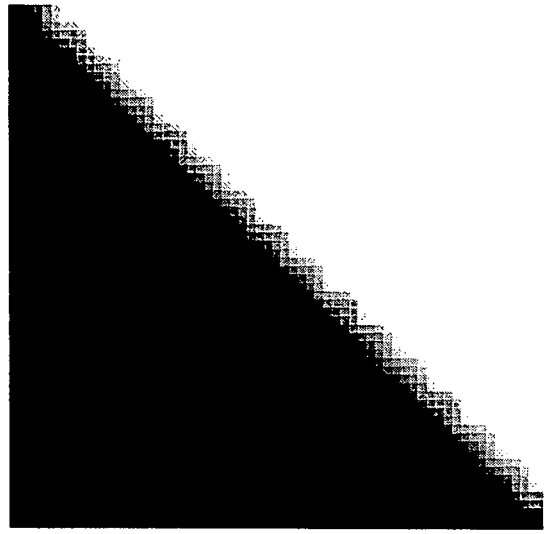
F I G. 20B
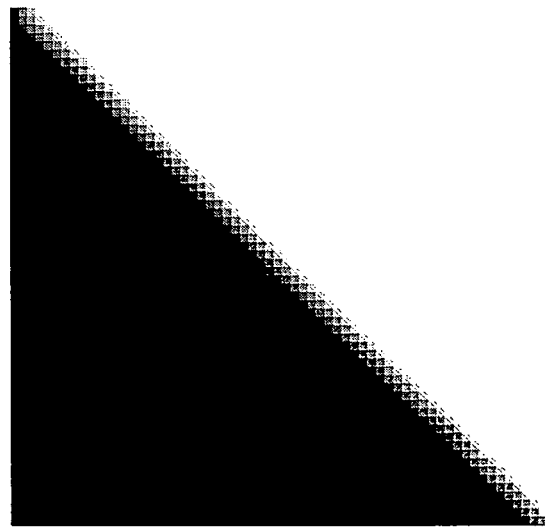

FIG. 21A
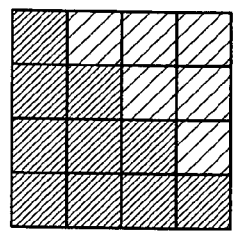
5
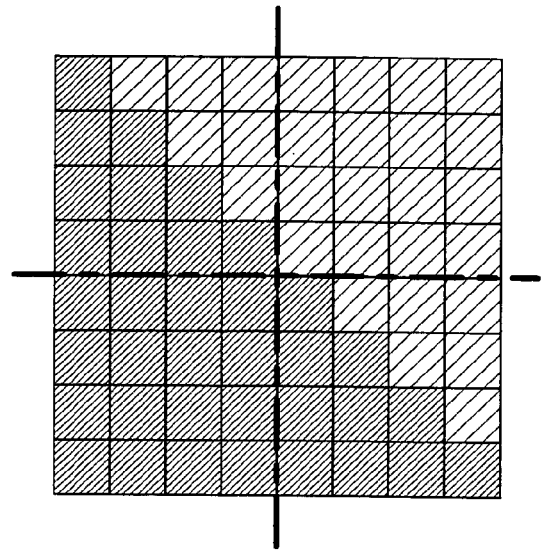
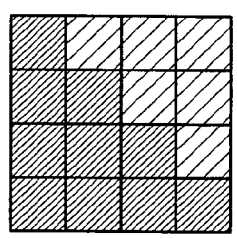
5
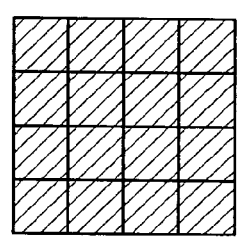
11
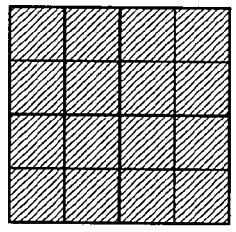
12
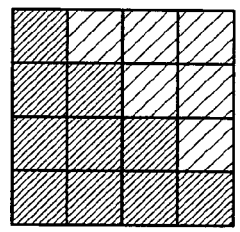
5
FIG. 21B
|  | UPPER LEFT | UPPER RIGHT | LOWER LEFT | LOWER RIGHT |
|---|---|---|---|---|
| #1 | #11 | #12 | #11 | #12 |
| #2 | #11 | #11 | #12 | #12 |
| #3 | #12 | #11 | #12 | #11 |
| #4 | #12 | #11 | #12 | #11 |
| #5 | #5 | #11 | #12 | #5 |
| #6 | #6 | #12 | #11 | #6 |
| ⋮ | ⋮ | ⋮ | ⋮ | ⋮ |
| #11 | #11 | #11 | #11 | #11 |
| #12 | #12 | #12 | #12 | #12 |
| ⋮ | ⋮ | ⋮ | ⋮ | ⋮ |

IMAGE PROCESSING APPARATUS, IMAGE DISPLAY APPARATUS, IMAGE FORMING APPARATUS, IMAGE PROCESSING METHOD AND STORAGE MEDIUM

CROSS-REFERENCE TO RELATED APPLICATION

This non-provisional application claims priority under 35 U.S.C. §119(a) on Patent Application No. 2007-318824 filed in Japan on Dec. 10, 2007, the entire contents of which are hereby incorporated by reference.

BACKGROUND

1. Technical Field

The present invention relates to an image processing apparatus for performing compression/encoding and decoding/decompression of image data. In particular, the present invention relates to an image processing apparatus capable of realizing multi-scalable drawing based on image data encoded with a vector quantization technique by high speed processing; an image display apparatus and image forming apparatus incorporating the image processing apparatus; an image processing method; and a storage medium.

2. Description of Related Art

In order to realize efficient transmission and recording of digital images and a reduction of the storage capacity, various techniques for reducing the amount of data by compression-encoding digital images have been proposed.

In particular, the JPEG (Joint Photographic Experts Group) technique is the most versatile technique as a compression-encoding technique for multi-value images. With the JPEG technique, multi-value image data represented in R(Red)G(green)B(Blue) space is converted into data represented in YCrCb space, and further converted sequentially to image data expressed by frequency components by DCT (Discrete Cosine Transform) processing. In general, if image data represents an image of an object existing in nature and is not an artificially created image, there is a small amount of elements of high frequency components, and there is a high concentration of low frequency components. The JPEG technique uses this characteristic and reduces the data amount of image data by eliminating the elements of high frequency components exceeding a predetermined value, and further compress the image data by encoding the data using Huffman encoding.

As another compression encoding technique, there is a vector quantization technique. The vector quantization technique is performed as follows. When processing image data on the basis of a predetermined block size, for example, a block consisting of 4×4 pixels, block patterns which appear at a high rate in a plurality of blocks of 4×4 pixels, and indices of the respective block patterns are stored in advance (they are called a code book). Then, when actually performing the processing on a block-by-block basis, a block pattern with highest correlation with each block is selected, and data on each block is approximated by replacing it with the index of the selected block pattern. Thus, by replacing data with a prepared block pattern, it is possible to reduce the data amount of image data. Further, by encoding the data, it is possible to compress the image data.

As means for increasing the speed of processing using the vector quantization technique, there is a technique in which inputted pixel patterns are classified by the features of specific images, and the index of an approximate pixel pattern is searched for from the code book. FIG. 1 is an explanatory view showing an example of a code book in which pixel patterns are classified into pixel patterns with an edge and pixel patterns without an edge, based on the presence or absence of an edge as a feature of an image. If an inputted pixel pattern contains an edge, the index of an approximate pixel pattern is searched for from a code book which stores pixel patterns with an edge. On the other hand, if an inputted pixel pattern does not contain an edge, the index of an approximate pixel pattern is searched for from a code book storing pixel patterns composed of flat blocks.

With the use of the vector quantization technique, when decoding (decompressing) compression-encoded image data, it is possible to decode (decompress) the image data by the process of referring to the code book based on the replaced index. Hence, it is possible to realize drawing based on image data at high speed with the vector quantization technique.

Moreover, as one of the compression encoding techniques, there is a technique for more smoothly outputting an image even when scaling is performed according to various resolutions. Japanese Patent Application Laid-Open No. 05-174140 (1993) discloses a technique which calculates a contour vector obtained by smoothing a contour detected from a binary image, scales the contour vector by a desired scale factor when performing resolution conversion, and fills in the pixels represented by either of binary values along the contour vector as a boundary to regenerate the image. Thus, there is disclosed a technique capable of obtaining a high-quality (multi-scalable) binary image even when the image is scaled by a desired scale factor.

SUMMARY

According to Japanese Patent Application Laid-Open No. 05-174140 (1993), it is possible to obtain a smooth image even by a desired scale factor. However, since the image is regenerated after calculating smoothed contour vectors and scaling the contour vectors by a desired scale factor, a longer processing time is required. It is therefore difficult to realize high-speed drawing by a desired scale factor. Moreover, if a contour is erroneously detected when calculating a smoothed contour vector, there is a possibility that the influence of erroneous detection appear markedly in the image regenerated after scaling. The technique disclosed in the Japanese Patent Application Laid-Open No. 05-174140 (1993) does not take into account image processing on a multi-value image.

In an apparatus for outputting (drawing) a multi-value image, such as an image display apparatus and an image forming apparatus, since higher image quality is demanded, it is desired to realize multi-scalable drawing based on encoded image data by high-speed processing.

The present invention has been made with the aim of solving the above problems, and it is an object of the invention to provide an image processing apparatus, an image processing method, an image display apparatus, an image forming apparatus and a storage medium capable of realizing multi-scalable image drawing by high-speed processing in which, even when an image is outputted after enlarging/reducing it by a desired scale factor, the image is smoothly drawn without detecting contours again from the image after being decoded and calculating smoothed contours.

An image processing apparatus according to a first aspect of the invention is an image processing apparatus comprising: a storage section for storing a plurality of different pixel patterns, indices indicating the respective pixel patterns, and contour vector information indicating contours appearing in the pixel patterns in association with each other; decoding means for decoding image data, which has been encoded by replacing an image composed of a plurality of pixels on a block-by-block basis, each block consisting of a predetermined number of pixels, with any of the pixel patterns and representing the pixel patterns by the indices, on the block-by-block basis by referring to the storage section and using a pixel pattern indicated by an index representing the image data; and scaling means for scaling a pixel pattern used for each block to be decoded by said decoding section and redrawing pixels near a contour in the pixel pattern after scaling by using the contour vector information corresponding to the pixel pattern.

An image processing apparatus according to a second aspect is characterized in that at least two kinds of pixel patterns are stored in the storage section, one kind being associated with the contour vector information and the other kind being not associated with the contour vector information.

An image processing apparatus according to a third aspect is characterized in that the scaling means includes means for calculating a line segment vector corresponding to a contour according to a scale factor by 'using the contour vector' information corresponding to an index representing the image data, and correcting means for correcting the pixel values of pixels near a contour after scaling the pixel pattern corresponding to the index so that the pixel values gradually decrease or increase according to distances from the line segment vector.

An image processing apparatus according to a fourth aspect is characterized in that the scaling means calculates the distance by using an absolute value of an outer product of the line segment vector and a vector from a starting point of the line segment vector to a position of the pixel near the contour.

An image processing apparatus according to a fifth aspect is characterized in that the scaling means determines whether a pixel near the contour is located inside or outside an area having the line segment vector as the contour, based on a sign of an outer product of the line segment vector and a vector from a starting point of the line segment vector to a position of the pixel near the contour.

An image processing apparatus according to a sixth aspect is characterized in that the scaling means includes determining means for determining whether a correction to be made to a pixel near the contour based on the line segment vector by the correcting means is effective or ineffective by using an inner product of the line segment vector and a vector from the starting point of the line segment vector to the pixel near the contour, and the correcting means corrects the pixel value of the pixel near the contour based on the distance from the line segment vector when the determining means determines that the correction is effective.

An image display apparatus according to a seventh aspect is characterized by including any one of the above-described image processing apparatuses, and image display means for displaying an image outputted from the image processing apparatus.

An image forming apparatus according to an eighth aspect is characterized by including any one of the above-described image processing apparatuses, and image forming means for forming an image outputted from the image processing apparatus.

An image processing method according to a ninth aspect of the invention is an image processing method comprising the steps of: storing a plurality of different pixel patterns, indices indicating the respective pixel patterns, and contour vector information indicating contours appearing in the pixel patterns in association with each other in a storage section; decoding image data, which has been encoded by replacing an image composed of a plurality of pixels on a block-by-block basis, each block consisting of a predetermined number of pixels, with any of the pixel patterns and representing the pixel patterns by the indices, on the block-by-block basis by referring to the storage section and using a pixel pattern indicated by an index representing the image data; scaling a pixel pattern used when decoding each block; and redrawing pixels near a contour in the pixel pattern after scaling by using the contour vector information corresponding to the pixel pattern.

A storage medium storing a computer program in a form readable by a computer according to a tenth aspect is a storage medium storing a computer program in a form readable by a computer, for directing a computer to function as a decoding section for decoding image data, which has been encoded by replacing an image composed of a plurality of pixels on a block-by-block basis, each block consisting of a predetermined number of pixels, with any of a plurality of different pixel patterns and representing the pixel patterns by indices indicating the respective pixel patterns, on the block-by-block basis by referring to a storage section storing the pixel patterns and corresponding indices in association with each other and by using a pixel pattern indicated by an index representing the image data, wherein said computer program directs the computer to function as a scaling section for scaling a pixel pattern used when decoding each block, and a redrawing section for redrawing pixels near a contour in the pixel pattern after scaling by using contour vector information indicating the contour appearing in the pixel pattern, the contour vector information being stored additionally in association with each pixel pattern in the storage section.

In the first and seventh through eleventh aspects, the indices indicating a plurality of different pixel patterns and the contour vector information indicating contours appearing in the respective pixel patterns are associated with each other, and the pixel patterns, indices and corresponding contour vector information are stored in the storage section. When decoding image data, which has been encoded by replacing an image composed of a plurality of pixels on the block-by-block basis, each block consisting of a predetermined number of pixels, with any of the pixel patterns and representing the pixel patterns by indices indicating the respective pixel patterns, by using pixel patterns, the used pixel patterns are scaled, and thereby the entire image is scaled. At this time, pixels near a contour appearing in a pixel pattern after scaling are redrawn using the contour vector information corresponding to the pixel pattern.

In the second aspect, the contour vector information may not be associated with part of the indices, and it is not necessarily to store the contour vector information in association with all the index information corresponding to all pixel patterns. Consequently, the storage capacity of the storage section is saved.

In the third aspect, based on the contour vector information corresponding to an index indicating received image data, a line segment vector corresponding to a contour in the pixel pattern after scaling is calculated. The pixel values of pixels near the contour after scaling the pixel pattern corresponding to the index are corrected so that the pixel values gradually decrease or increase according to the distances from the line segment vector.

In the fourth aspect, the distance between a pixel near the contour and the line segment vector is calculated using the absolute value of the outer product of the line segment vector and a vector from the starting point of the line segment vector to the position of the pixel near the contour. Hence, the pixel value is corrected according to the distance from the line segment vector corresponding to the contour.

In the fifth aspect, whether a pixel near the contour is located inside or outside an area having the line segment vector as the contour is determined based on the sign of the outer product of the line segment vector and a vector from the starting point of the line segment vector to the position of the pixel near the contour. Accordingly, it is possible to correct only the outside of the contour where jaggies are apparent, and it is possible to prevent a correction from being made based on an erroneous determination as to whether the pixel is located inside or outside the contour.

In the sixth aspect, whether a correction to be made to the pixel value of a pixel near a contour based on the distance from the line segment vector is effective or ineffective is determined based on the inner product of the line segment vector and a vector from the starting point of the line segment vector to the position of the pixel near the contour. When determined to be effective, the pixel value is corrected according to the distance from the line segment vector, and the pixel is redrawn. Thus, it is possible to prevent the pixel value of the pixel near the contour from being erroneously corrected.

In the first through eleventh aspects, every time image data is decoded, pixel patterns associated with indices indicating the image data are scaled on the block-by-block basis, each block consisting of a predetermined number of pixels, and the corresponding contour vector information is referred to achieve a correction of the pixel values of pixels near a contour to provide a smooth contour even by a desired scale factor, without scaling the decoded image, detecting a contour from the image after scaling and calculating the contour vector, and therefore it is possible to realize multi-scalable drawing by high-speed processing.

The above and further objects and features will more fully be apparent from the following detailed description with accompanying drawings.

BRIEF DESCRIPTION OF THE SEVERAL VIEWS OF THE DRAWINGS

FIG. 4 is an explanatory view schematically showing an example of the contents of the code book stored in a storage section of the codec circuit of Embodiment 1;

FIG. 7 is an explanatory view showing an example of the contents of pixel patterns for searching for contours;

FIGS. 8A to 8D are, explanatory views showing a contour of a resolution conversion process performed by a resolution converting circuit constituting the codec circuit of Embodiment 1;

FIG. 10 is a flowchart showing the processing steps of the redrawing process performed by the resolution converting circuit constituting the codec circuit of Embodiment 1;

FIGS. 14A to 14C are explanatory views showing one specific example of the results of the pixel value correction process performed by the resolution converting circuit constituting the codec circuit of Embodiment 1;

FIGS. 20A and 20B are explanatory views showing an example of the contents of an image scaled by the codec circuit of Embodiment 1;

FIGS. 21A and 21B are explanatory views showing an example of the contents of pixel patterns having the scaled relationship, which are stored in the storage section of the codec circuit of Embodiment 1;

DETAILED DESCRIPTION

The following description will specifically explain preferred embodiments of the invention based on the drawings.

Embodiment 1

Embodiment 1 explains an example in which an image processing apparatus according to this embodiment is realized by configuring an integrated circuit (codec circuit), which is designed to perform the process of encoding/decoding an image based on a vector quantization technique, to further execute a resolution conversion (scaling) process using contour vector information as to be explained below.

Figure 1:
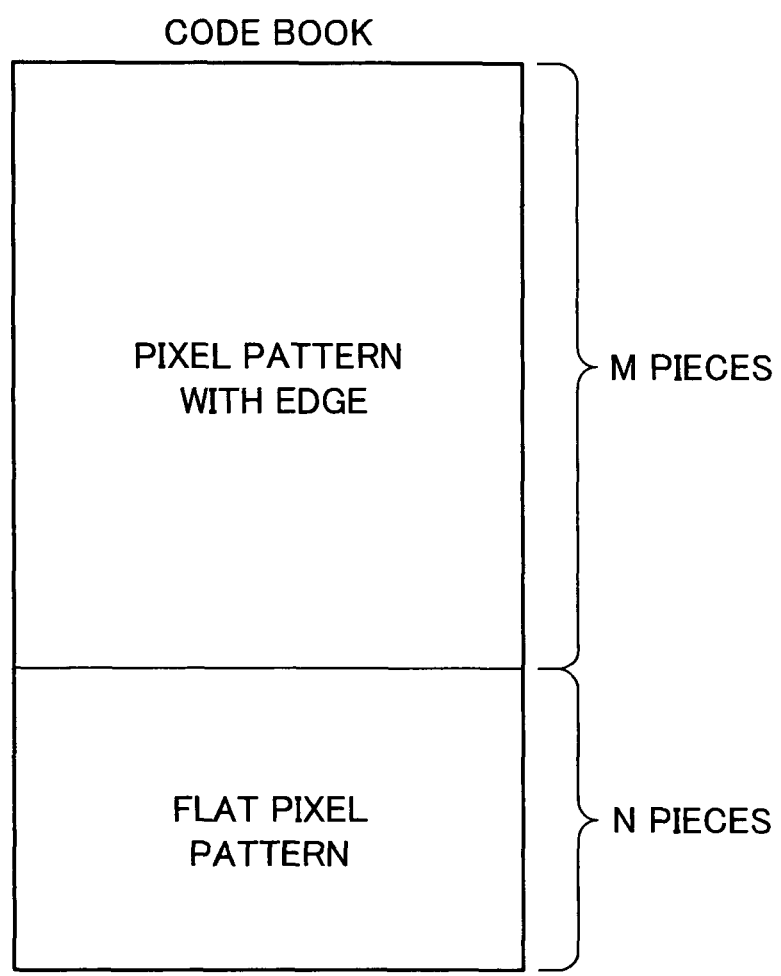
FIG. 1 is an explanatory view showing an example of a code book containing pixel patterns classified into pixel patterns containing edges and pixel patterns containing no edges, based on the presence or absence of an edge as the feature of an image.
Figure 2:
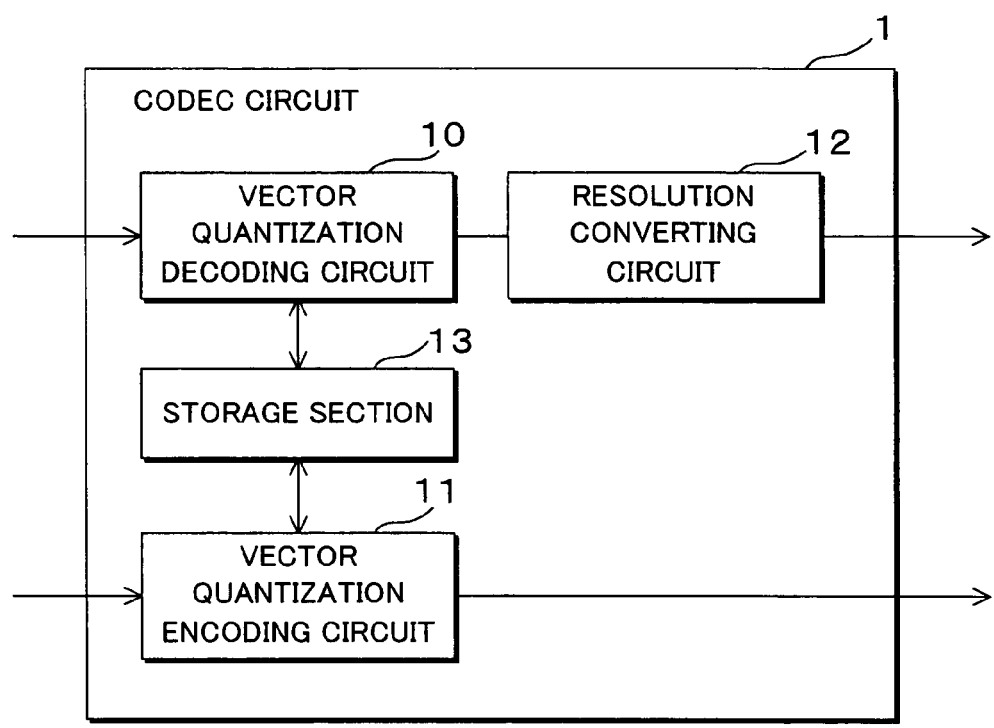
FIG. 2 is a block diagram showing the structures a codec circuit of Embodiment 1.

FIG. 2 is a block diagram showing the structures of a codec circuit of Embodiment 1. A codec circuit 1 comprises a vector quantization encoding circuit 11 for encoding image data by using a vector quantization technique; a vector quantization decoding circuit 10 (decoding means, decoding section) for decoding image data encoded by vector quantization; a resolution converting circuit 12 (scaling means, scaling section, redrawing section) for performing a resolution conversion process; and a storage section 13 for storing various kinds of information for use in vector quantization.

Each of the vector quantization encoding circuit 11, vector quantization decoding circuit 10 and resolution converting circuit 12 is an integrated circuit designed to perform the processing explained later. For the storage section 13, a non-volatile memory, such as a mask ROM (Read Only Memory), a PROM (Programmable ROM), and an EPROM (Erasable Programmable ROM), is used.

When the codec circuit 1 receives an unencoded image, the vector quantization encoding circuit 11 encodes the image. With the vector quantization technique, the image is encoded on a block-by-block basis. The vector quantization encoding circuit 11 looks at the storage section 13 and searches for a pixel pattern having the highest correlation (similarity) with a pixel pattern appearing on the image. The vector quantization encoding circuit 11 reduces the amount of data by replacing the pixel pattern appearing on the received image with the index value of the searched pixel pattern, and thereby compresses the image data. The image data encoded by the replacement with the index value will be hereinafter referred to as the index image.

When the codec circuit 1 receives an index image, the vector quantization decoding circuit 10 decodes the image. The vector quantization decoding circuit 10 looks at the storage section 13, specifies a pixel pattern based on the index value representing the index image, and replaces the index value with the specified pixel pattern on a block-by-block basis to decode the image.

In the codec circuit 1, the resolution converting circuit 12 scales the image decoded on the block-by-block basis by the vector quantization decoding circuit 10, and outputs the resulting image. The resolution converting circuit 12 performs the process of scaling the image decoded on the block-by-block basis, according to an arbitrary resolution, based on contour vector information (to be described later) corresponding to the pixel pattern of the block. A scale factor is given to the codec circuit 1 by inputting a signal indicating the scale factor from outside, and the resolution converting circuit 12 receives the signal.

Figure 3:
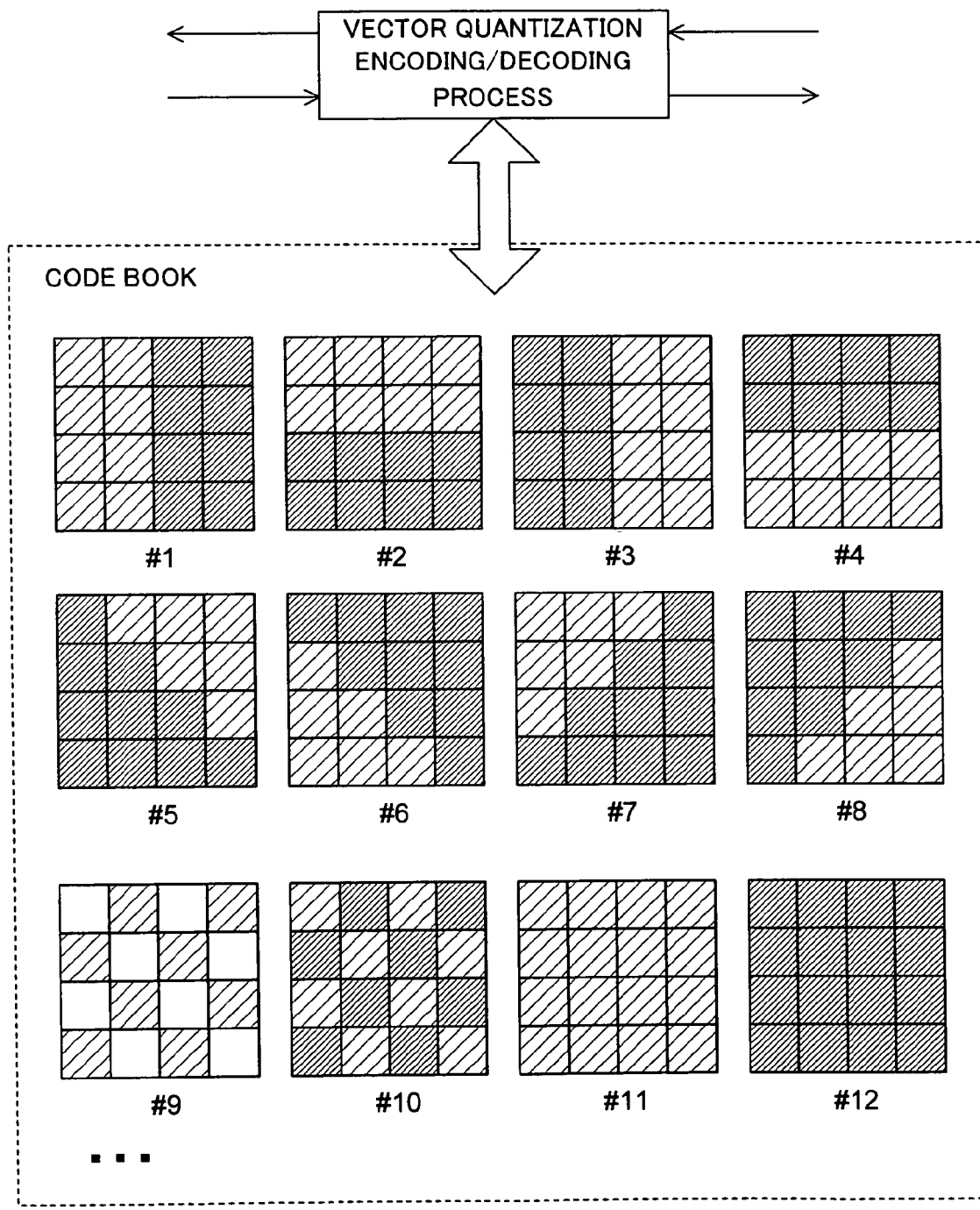
FIG. 3 is an explanatory view showing a contour of an encoding/decoding process using a vector quantization technique, which is performed by the codec circuit of Embodiment 1.

FIG. 3 is an explanatory view showing a contour of the encoding/decoding process using a vector quantization technique, which is performed by the codec circuit 1 of Embodiment 1. The explanatory view of FIG. 3 schematically illustrates the contents of a code book stored in the storage section 13. Additionally, the explanatory view of FIG. 3 shows a flow of an ordinary vector quantization encoding/decoding process performed by the vector quantization encoding circuit 11 or the vector quantization decoding circuit 10 with reference to the code book. The explanatory view of FIG. 3 illustrates an example of the contents of pixel patterns of blocks, each block consisting of 4×4 pixels, with unique index values added under the respective pixel patterns. A group of pixel patterns as shown in the example of the contents in the explanatory view of FIG. 3 and the index values corresponding to the respective pixel patterns are stored as a code book in the storage section 13.

As illustrated in the explanatory view of FIG. 3, the vector quantization encoding circuit 11 handles the received image on a block-by-block basis, each block consisting of 4×4 pixels. The vector quantization encoding circuit 11 looks at the code book in the storage section 13 and searches for a pixel pattern nearest to the pixel pattern of each block of the received image. The vector quantization encoding circuit 11 performs a vector quantization encoding process in which each block is replaced with the index value of a searched pixel pattern: On the other hand, the vector quantization decoding circuit 10 performs a vector quantization decoding process in which it refers to the code book in the storage section 13 for a pixel pattern corresponding to the index value representing the index image, and reconstructs a block consisting of 4×4 pixels of the referred pixel pattern.

When the unencoded image received by the codec circuit 1 is an 8-bit grayscale image, a block consisting of 4×4 pixels is expressed by 128 bits (16 bytes). When the total number of types of pixel patterns, or indices, contained in the code book prepared for this is 1024 (two to the tenth power), it is possible to express an index value by 10 bits. Since 128 bits are compressed to 10 bits, it is possible to realize a compression factor of at least 12.8 (=128/10) by the vector quantization encoding process.

The LBG (Linde-Buzo-Gray) algorithm is generally used for determining representative pixel patterns contained in the code book. The LBG algorithm is a method for minimizing distortion caused by approximating a block of an image to any of the prepared pixel patterns in the vector quantization encoding/decoding process. In the LGB algorithm, representative pixel patterns are studied in advance by using various kinds of images, and pixel patterns having the smallest mean distortion are determined to be representative pixel patterns. For a block consisting of 4×4 pixels of the received image, the vector quantization encoding circuit 11 specifies a pixel pattern having the smallest distortion among the pixel patterns contained in the code book as the pixel pattern having the highest similarity, and performs the vector quantization encoding process by replacing the image on a block-by-block basis with the index value of the pixel pattern.

FIG. 4 is an explanatory view schematically showing an example of the contents of the code book stored in the storage section 13 of the codec circuit 1 of Embodiment 1. As illustrated in the explanatory view of FIG. 4, the pixel patterns contained in the code book stored in the storage section 13 of the codec circuit 1 are classified into at least two types: pixel patterns having edge direction (#1 to #8); and pixel patterns having no edge direction (#9 to #12). In order to explain the index values discriminately from other numbers, '#' is added to the index values in the following explanation.

For the pixel patterns in the code book stored in the storage section 13 of the codec circuit 1 of Embodiment 1, contour vector information indicating a contour appearing in each pixel pattern is further stored in association with the pixel pattern. Pixel patterns with which the contour vector information is associated are the pixel patterns having edge direction shown in the explanatory view of FIG. 4. It is not necessary to store the contour vector information in association with pixel patterns having no edge direction. Since the contour vector information is not necessarily stored for all the pixel patterns, it is possible to save the storage capacity of the storage section 13.

Figure 5:
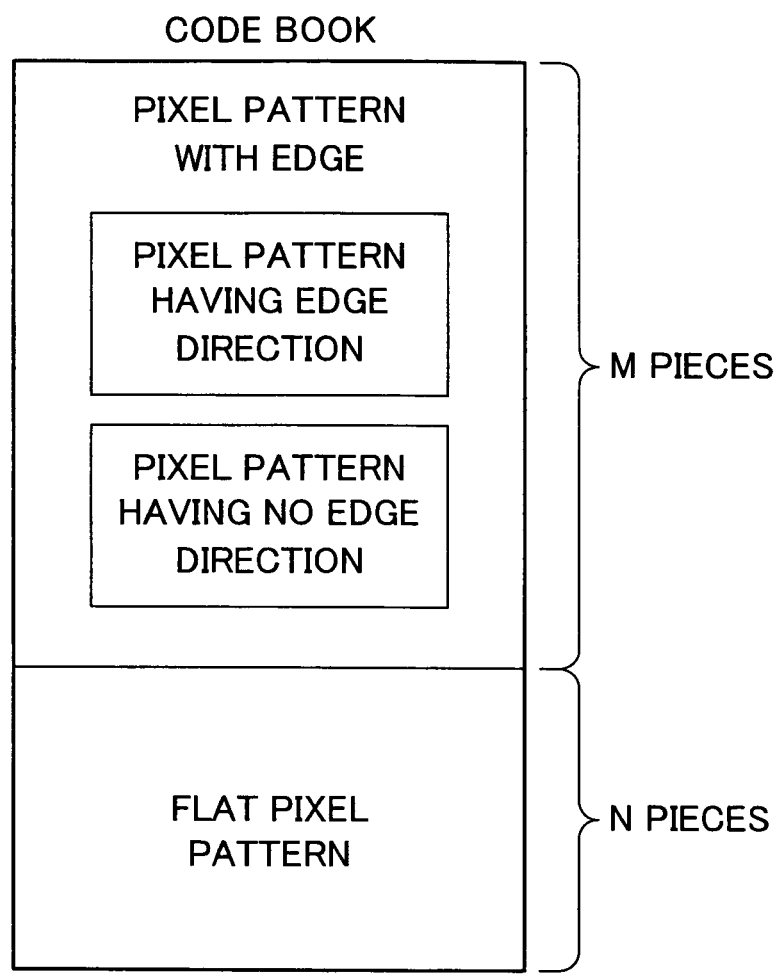
FIG. 5 is an explanatory view showing an example of the classified contents of the code book stored in the storage section of the codec circuit of Embodiment 1.

Moreover, in order to perform the vector quantization encoding process at high speed, it is possible to use a method in which the pixel patterns in the code book are classified by the features of specific images, a determination is made as to which class an inputted pixel pattern belongs, and an index of an approximate pixel pattern is searched for from the classified pixel patterns. FIG. 5 is an explanatory view showing an example of the classified contents in the code book stored in the storage section 13 of the codec circuit 1 of Embodiment 1. As illustrated in the explanatory view of FIG. 5, pixel patterns are classified into pixel patterns containing edges and flat pixel patterns containing no edges, based on the presence or absence of edge as the feature of a specific image. The pixel patterns containing edges include pixel patterns having edge direction which are associated with the contour vector information, and pixel patterns having no edge direction which are not associated with the contour vector information.

Figure 6A:
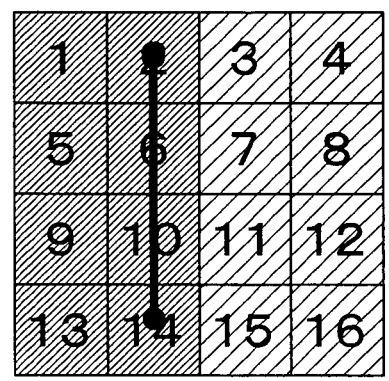
FIGS. 6A to 6C are explanatory views schematically showing contour vector information stored in the storage section of the codec circuit of Embodiment 1.
Figure 6B:
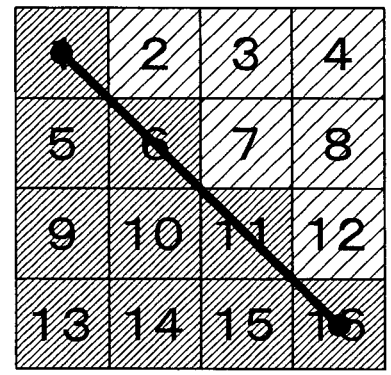
Figure 6C:
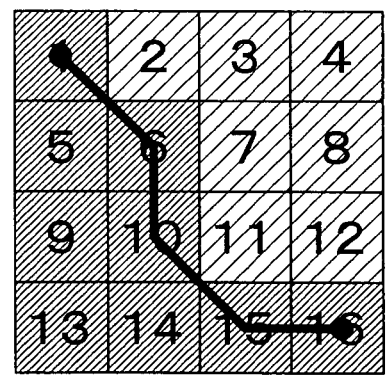

FIGS. 6A to 6C are explanatory views schematically showing the contour vector information stored in the storage section 13 of the codec circuit 1 of Embodiment 1. As explained in FIGS. 6A to 6C, the contour vector information is expressed by assigning the pixels in a block consisting of 4×4 pixels in a pixel pattern stored in the code book with the numbers "1" to "16" in a lateral direction from the left top. FIG. 6A shows a pixel pattern with the index value "#3" shown in the explanatory view of FIG. 4 and the contour vector information indicating a contour appearing in the pixel pattern. Similarly, FIG. 6B shows a pixel pattern with the index value "#5" shown in the explanatory view of FIG. 4 and the contour vector information indicating a contour appearing in the pixel pattern, and FIG. 6C shows other pixel pattern contained in the code book and the contour vector information indicating a contour appearing in the pixel pattern.

In the example of the pixel pattern shown in FIG. 6A, the contour appears in a vertical direction at the center of a block consisting of 4×4 pixels. The contour vector information expresses the relationship of connected pixels corresponding to the contour portion by a series of pixel numbers. In the example of the pixel pattern shown in FIG. 6A, the pixels corresponding to the contour portion are connected in the order "pixel 2, pixel 6, pixel 10, and pixel 14". In this case, the contour vector consists of three line segments: a line segment from the center of pixel 2 to the center of pixel 6, a line segment from the center of pixel 6 to the center of pixel 10, and a line segment from the center of pixel 10 to the center of pixel 14. The contour vector information for the pixel pattern "#3" is expressed by EV3=(2, 6, 10, 14).

Similarly, in the example of the pixel pattern shown in FIG. 6B, the pixels corresponding to the contour portion are connected in the order "pixel 1, pixel 6, pixel 11, and pixel 16". In this case, the contour vector consists of three line segments: a line segment from the center of pixel 1 to the center of pixel 6, a line segment from the center of pixel 6 to the center of pixel 11, and a line segment from the center of pixel 11 to the center of pixel 16. The contour vector information for the pixel pattern "#5" is expressed by EV5=(1, 6, 11, 16).

In the example of the pixel pattern shown in FIG. 6C, the pixels corresponding to the contour portion are connected in the order "pixel 1, pixel 6, pixel 10, pixel 15, and pixel 16". In this case, the contour vector consists of four line segments: a line segment from the center of pixel 1 to the center of pixel 6, a line segment from the center of pixel 6 to the center of pixel 10, a line segment from the center of pixel 10 to the center of pixel 15, and a line segment from the center of pixel 15 to the center of pixel 16. The contour vector information for the pixel pattern shown in FIG. 6C is expressed by EVN=(1, 6, 10, 15, 16) (N is an arbitrary number).

More specifically, for {the index values of pixel patterns}={1, 2, 3, 4, 5, . . . }, {contour vector information EV corresponding to the respective indices}={EV1, EV2, EV3, EF4, EV5, . . . }={(3, 7, 11, 15), (9, 10, 11, 12), (2, 6, 10, 14), (5, 6, 7, 8), (1, 6, 11, 16), . . . } and the index values are stored in association with each other in the storage section 13 beforehand as the contour vector information.

For each contour indicated by the contour vector information shown in the explanatory views of FIGS. 6A to 6C, it may be possible to automatically calculate the contour vector information and store it in the storage section 13 by specifying connected pixels corresponding to the contour portion by determining which pattern of a block consisting of 2×2 pixels matches the pixel pattern as to be described later. FIG. 7 is an explanatory view showing an example of the contents of pixel patterns for searching for contours. In the explanatory view of FIG. 7, eight pixel patterns are illustrated. Two patterns in the top row show a vertical connection, or a connection of upper and lower pixels. Two patterns in the upper middle row show a horizontal connection, or a connection of the left and right pixels. Two patterns in the lower middle row show a 45° diagonal connection, or a connection of the lower left pixel and the upper right pixel. Two patterns in the bottom row show a minus 45° diagonal connection, or a connection of the upper left pixel and the lower right pixel. In the case where the contour vector information is automatically calculated, operating means binarizes each pixel pattern consisting of 4×4 pixels contained in the code book, based on the gray levels of the pixel values, and determines which of the eight patterns shown in the explanatory view of FIG. 7 has the highest similarity, and thereby specifies connected pixels corresponding to the contour portion.

Next, the following will explain the resolution conversion process which is performed using the contour vector information by the resolution converting circuit 12 on the image which has been decoded by the vector quantization decoding circuit 10 on a block-by-block basis, each block consisting of a predetermined number of pixels.

FIGS. 8A to 8D are explanatory views showing a contour of the resolution conversion process performed by the resolution converting circuit 12 constituting the codec circuit 1 of Embodiment 1. " . . . , 12, 2, 11, 2, . . . " shown in the explanatory views of FIGS. 8A to 8D is a permutation of index values of the pixel patterns indicated by an index image. The vector quantization decoding circuit 10 of the codec circuit 1 specifies a pixel pattern by referring to the code book for an index value. In the example shown in the explanatory views of FIGS. 8A to 8D, the vector quantization decoding circuit 10 decodes a block consisting of 4×4 pixels by using the pixel pattern shown in FIG. 8A from the index value "#3".

Accordingly, the resolution converting circuit 12 receives the pixel pattern used for decoding in the vector quantization decoding circuit 10 and the index value of the pixel pattern, and further performs the following process based on a scale factor given from outside. The resolution converting circuit 12 performs the process of scaling a pixel pattern used for decoding. For example, when outputting an image by reducing it to one-half of its original size, the process of reducing the pixel pattern as shown in FIG. 8B is performed. In the case where the pixel pattern is reduced to one-half of its original size, it is possible to select the second, fourth, tenth and twelfth pixel values; the fifth, seventh, thirteenth and fifteenth pixel values; or the sixth, eighth, fourteenth and sixteenth pixel values, instead of the first, third, ninth and eleventh pixel values from the top left as shown in FIG. 8B. Similarly, when outputting the image by enlarging it to twice the original size, the process of enlarging the pixel pattern is performed as shown in FIG. 8C, and, when outputting the image by enlarging it to three times the original size, the process of enlarging the pixel pattern is performed as shown in FIG. 8D. The process shown in FIGS. 8A to 8D is called the neighboring pixel interpolation method in which the pixel value of a pixel nearest in terms of distance to a pixel to be interpolated among four neighboring pixels is selected for interpolation.

Further, the resolution converting circuit 12 redraws the pixel values of the pixels contained in the pixel pattern after scaling, particularly the pixels near a contour based on the contour vector information. The details are as follows.

Figure 9A:
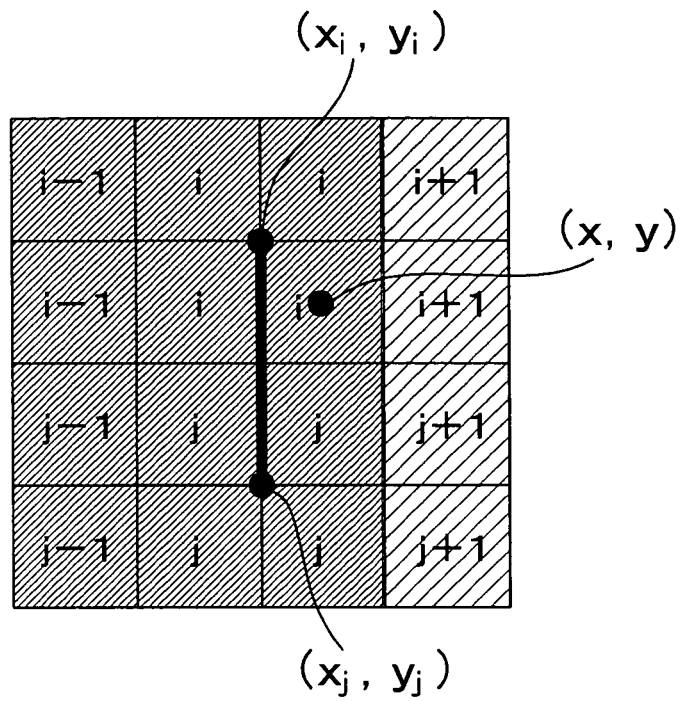
FIGS. 9A and 9B are explanatory views showing a contour of a process of redrawing pixels based on the contour vector information, which is performed by the resolution converting circuit in the codec circuit of Embodiment 1.
Figure 9B:
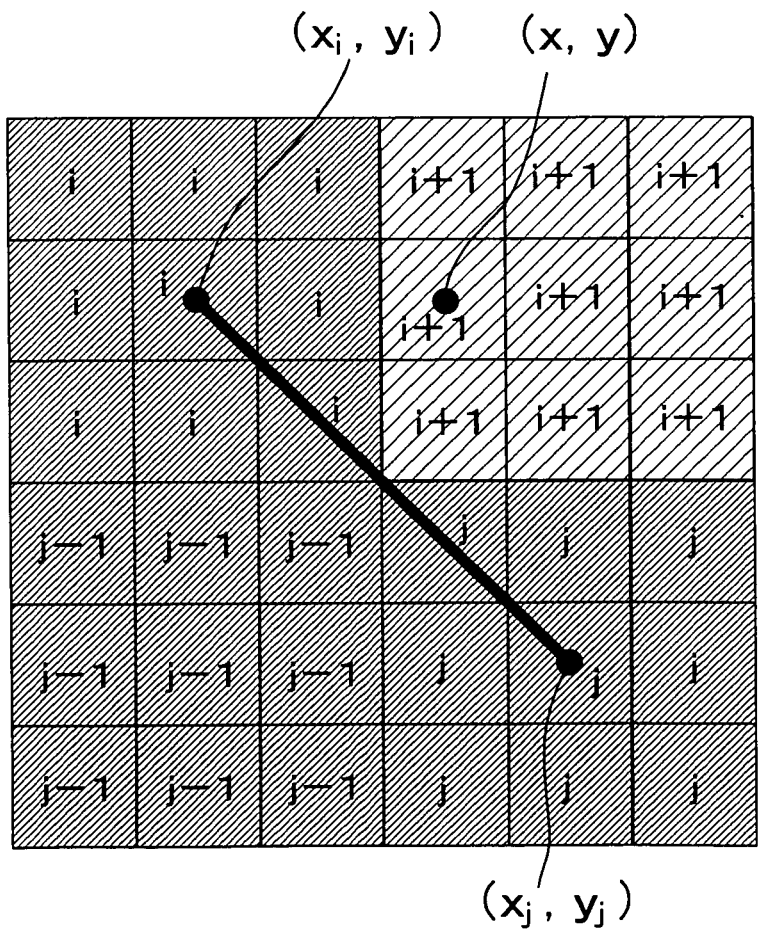

FIGS. 9A and 9B are explanatory views showing a contour of the process of redrawing pixels based on the contour vector information by the resolution converting circuit 12 in the codec circuit 1 of Embodiment 1. Each rectangle shown in FIGS. 9A and 9B represents a part of the pixel pattern after scaling, and codes i−1, i, i+1, . . . , j−1, j, j+1, . . . which are added to the respective pixels indicate the original pixel numbers of the pixel values selected from the pixel pattern before scaling. FIG. 9A shows a part of the pixel pattern after being enlarged to twice the original size, and FIG. 9B shows a part of the pixel pattern after being enlarged to three times the original size. (x, y) in FIGS. 9A and 9B are coordinates indicating the position of an arbitrary pixel to be redrawn. The thick line in FIGS. 9A and 9B indicates a contour vector (a line segment from pixel i to pixel j); a point $(x_i, y_i)$ indicates a position corresponding to the center of the pixel i as the starting point of the contour vector after scaling; and a point $(x_j, y_j)$ indicates a position corresponding to the center of the $pixel_j$ as the end point of the contour vector after scaling.

The resolution converting circuit 12 calculates the distance between the position (x, y) of each pixel to be redrawn and the contour vector (line segment from pixel i to pixel j) nearest to the position (x, y), and corrects the pixel value smoothly according to the distance and redraws the pixel.

Referring to the flowchart, the following will explain the redrawing process performed by the resolution converting circuit 12. FIG. 10 is a flowchart showing the processing steps of the redrawing process performed by the resolution converting circuit 12 constituting the codec circuit 1 of Embodiment 1.

The resolution converting circuit 12 reads from the storage section 13 the contour vector information corresponding to an index value received from the vector quantization decoding circuit 10 (step S11). For the center position (x, y) of each pixel to be redrawn in the pixel pattern after scaling, the resolution converting circuit 12 calculates a line segment vector $a_{i \to j}$ corresponding to a contour in the pixel pattern after scaling, a vector $b_{i \to j}$ from the starting point of the line segment vector $a_{i \to j}$ to the center position (x, y) of the pixel to be redrawn, and a vector $c_{i \to j}$ from the end point of the line segment vector $a_{i \to j}$ to the center position (x, y) of the pixel to be redrawn for each of all contour vectors (i→j) shown in the contour vector information read in step S11 (step S12).

By using the vector $a_{i \to j}$, vector $b_{i \to j}$, and vector $c_{i \to j}$ calculated for each contour vector in step S12, the resolution converting circuit 12 calculates the inner product $(a_{i \to j} \cdot b_{i \to j})$, inner product $(-a_{i \to j} \cdot c_{i \to j})$, distance d from the center position (x, y) of the pixel to be redrawn to the line segment vector $a_{i \to j}$, and the sign (plus or minus) of the outer product $(a_{i \to j} \times b_{i \to j})$ (step S13).

The resolution converting circuit 12 specifies the shortest distance among the distances d from the respective line segment vectors calculated in step S13 (step S14), and determines whether the specified line segment vector $a_{i \to j}$ at the shortest distance is a horizontal vector or a vertical vector (step S15).

If a determination is made that the line segment vector $a_{i \to j}$ at the shortest distance is not a horizontal vector or a vertical vector (S15: NO), the resolution converting circuit 12 determines, based on the sign of the outer product calculated in step S13, whether or not the pixel to be redrawn is located outside the contour (step S16).

If a determination is made that the pixel to be redrawn is located outside the contour (S16: YES), the resolution converting circuit 12 determines whether or not the positional relationship between the line segment vector $a_{i \to j}$ at the shortest distance and the center position (x, y) of the pixel to be redrawn is effective (step S17).

If a determination is made that the positional relationship between the line segment vector $a_{i \to j}$ at the shortest distance and the center position (x, y) of the pixel to be redrawn is effective (S17: YES), the resolution converting circuit 12 calculates and corrects the pixel value so that the value increases or decreases gradually according to the shortest distance d (step S18), and determines whether or not the redrawing process has been completed on all the pixels to be redrawn in the pixel pattern after enlargement (step S19).

If a determination is made that the line segment vector $a_{i \to j}$ at the shortest distance is a horizontal vector or a vertical vector (S15: YES), the resolution converting circuit 12 uses a pixel value selected by the neighboring pixel interpolation method as it is for the pixel after scaling (S20), and proceeds the processing to step S19. If the resolution converting circuit 12 determines that the pixel to be redrawn is located inside the contour (S16: NO), it uses the pixel value selected by the neighboring pixel interpolation method as it is for the pixel after scaling (S20), and proceeds the processing to step S19. Further, if a determination is made that the line segment vector $a_{i \to j}$ at the shortest distance is ineffective (S17: NO), the resolution converting circuit 12 uses the pixel value selected by the neighboring pixel interpolation method as it is for the pixel after scaling (S20), and proceeds the processing to step S19.

If the resolution converting circuit 12 determines that the redrawing process has not been finished on any one of the pixels to be redrawn (S19: NO), it returns the processing to step S11 and performs the processing on other pixel to be redrawn.

If the resolution converting circuit 12 determines in step S19 that the redrawing process has been completed on all the pixels to be redrawn (S19: YES), it finishes the redrawing process.

In step S16 of the processing steps shown in the flowchart of FIG. 10, the resolution converting circuit 12 makes a correction only when a determination is made that the pixel to be redrawn is located outside the contour. However, this embodiment is not limited to this, and it is possible to make a correction even when the pixel to be redrawn is located inside the contour.

Thus, in the resolution converting circuit 12 constituting the codec circuit 1, every time the vector quantization decoding circuit 10 performs decoding on a block-by-block basis to decode each block consisting of 4×4 pixels by using a pixel pattern, the pixel pattern is scaled, and consequently the entire image is scaled by the scaling processing. At this time, the contour vector information associated with the pixel pattern in advance is read, and the vicinity of the contour is redrawn using a contour vector indicated by the contour vector information without performing the process of detecting a contour appearing in the pixel pattern, and therefore it is possible to realize high-speed scaling processing.

Next, the following will explain the details of the processing steps shown in the flowchart of FIG. 10.

Figure 11:
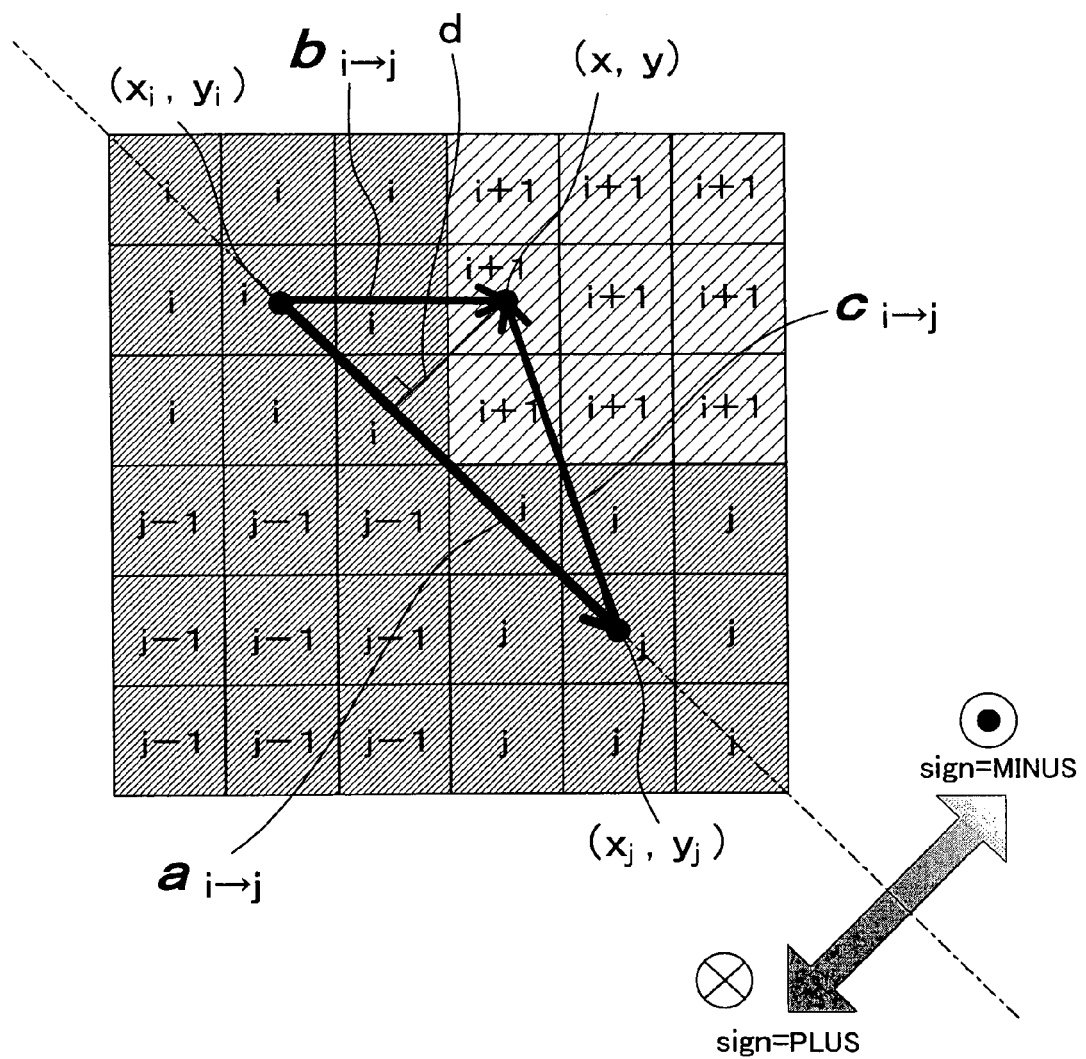
FIG. 11 is an explanatory view showing vectors and distance d calculated by the resolution converting circuit constituting the codec circuit of Embodiment 1.

FIG. 11 is an explanatory view showing the vectors and distance d calculated by the resolution converting circuit 12 constituting the codec circuit 1 of Embodiment 1. The explanatory view of FIG. 11 shows a part of the vicinity of a contour in a pixel pattern after being scaled to three times the original size. The explanatory view of FIG. 11 shows a vector $a_{i \to j}$, a vector $b_{i \to j}$ and a vector $c_{i \to j}$ calculated for one contour vector (i→j) by the process in step S12 of the processing steps shown in the flowchart of FIG. 10.

The resolution converting circuit 12 calculates the line segment vector $a_{i \to j}$ corresponding to the contour in the pixel pattern after being scaled, based on all contour vectors shown by the contour vector information, by Equation (1) shown below. The line segment vector $a_{i \to j}$ is a line segment vector connecting the center position $(x_i, y_i)$ of a pixel group from which the pixel value of a pixel corresponding to the starting point (pixel i) of the contour vector is selected and the center position $(x_j, y_j)$ of a pixel group from which the pixel value of a pixel corresponding to the end point (pixel j) of the contour vector is selected after scaling.

$$\vec{a}_{i \to j} = (a_x, a_y) = (x_j - x_i, y_j - y_i) \tag{1}$$

$$\vec{b}_{i \to j} = (b_x, b_y) = (x - x_i, y - y_i) \tag{2}$$

$$\vec{c}_{i \to j} = (c_x, c_y) = (x_j - x, y_j - y) \tag{3}$$

For example, when the pixel pattern to be scaled is "#5" and the resolution converting circuit 12 enlarges it to three times the original size, the contour vector information corresponding to the "#5" pixel pattern is EV5=(1, 6, 11, 16). First, for one contour vector (a line segment from the center of pixel 1 to the center of pixel 6) in the "#5" pixel pattern, a line segment vector $a_{1 \to 6}$ connecting the center $(x_1, y_1)$ of a pixel group from which the pixel value of pixel 1 is selected and the center position $(x_6, y_6)$ of a pixel group from which the pixel value of pixel 6 is selected is calculated. Similarly, for one contour vector (a line segment from the center of pixel 6 to the center of pixel 11), a line segment vector $a_{6 \to 11}$ is calculated, and for other one contour vector (a line segment from the center of pixel 11 to the center of pixel 16), a line segment vector $a_{11 \to 16}$ is calculated.

For a plurality of line segment vectors $a_{i \to j}$ calculated as described above, the resolution converting circuit 12 calculates a vector $b_{i \to j}$ and a vector $c_{i \to j}$ to the center position of each pixel to be redrawn by Equations (2) and (3), respectively.

For the line segment vector $a_{i \to j}$ corresponding to each contour vector, the resolution converting circuit 12 calculates the distance d from the line segment vector $a_{i \to j}$ to each pixel to be redrawn, based on the outer product of the line segment vector $a_{i \to j}$ and the vector $b_{i \to j}$ by Equation (4) shown below.

$$d = \frac{|\vec{a}_{i \to j} \times \vec{b}_{i \to j}|}{|\vec{a}_{i \to j}|} = \frac{|a_x * b_y - a_y * b_x|}{\sqrt{a_x * a_x + a_y * a_y}} \tag{4}$$

Thus, since the distance from the line segment corresponding to the contour is calculated, it is possible to smoothly correct the pixel value according to the distance. In short, by decreasing or increasing the pixel value with an increase in the distance orthogonal to the contour, it is possible to achieve drawing with less jaggies. The method of correcting the pixel value according to the distance by the resolution converting circuit 12 will be explained in detail later.

Further, the resolution converting circuit 12 calculates the sign of the outer product $(a_{i \to j} \times b_{i \to j})$ of the line segment vector $a_{i \to j}$ and the vector $b_{i \to j}$ from the starting point of the line segment vector $a_{i \to j}$ to the center position of a pixel to be redrawn by Equation (5) shown below.

$$\text{sign} = (\vec{a}_{i \to j} \times \vec{b}_{i \to j} \geq 0)? \text{ plus:minus} \tag{5}$$

When the sign of the outer product calculated by Equation (5) is plus (and when the calculated value of the outer product is zero), it is possible to determine that the pixel to be redrawn is located inside the contour. Whereas when the sign is minus, it is possible to determine that the pixel to be redrawn is located outside the contour. The alternate long and short dash line in FIG. 11 shows a zero outer product, that is, parallel directions of the vector $a_{i \to j}$ and vector $b_{i \to h}$. A mark indicated with a black point in a circle in FIG. 11 shows the direction of the outer product directed forward from the back side perpendicularly to the drawing surface, and the sign is minus in this case. On the other hand, a mark indicated by × in a circle in FIG. 11 shows the direction of the outer product directed backward from the front side perpendicularly to the drawing surface, and the sign is plus in this case. When the angle of the vector $b_{i \to j}$ to the alternate long and short dash line (the direction parallel to the contour vector) in FIG. 11 is between 0° and 180° in the counterclockwise direction, the pixel to be redrawn is located outside the contour, whereas when the angle is smaller than –0° but not smaller than –180°, the pixel to be redrawn is located inside the contour. Note that when the value of the outer product is zero as shown by Equation (5), the sign is plus.

Next, referring to the explanatory view, the following will explain the process of determining whether the positional relationship with the line segment vector $a_{i \to j}$ is effective or ineffective in step S17 of the processing steps shown in the flowchart of FIG. 10.

Figure 12:
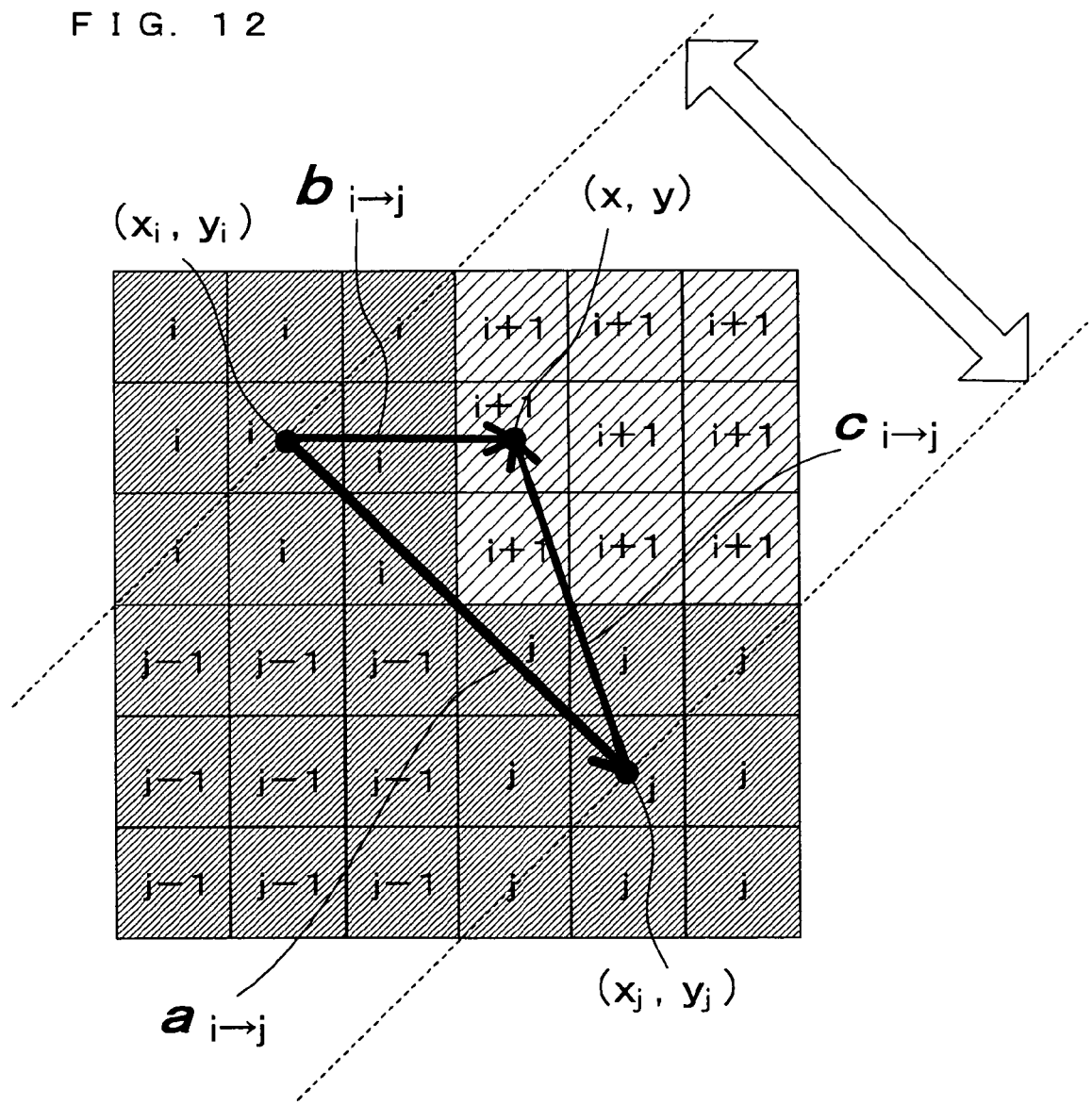
FIG. 12 is an explanatory view showing a criteria range used for determining whether a contour vector is effective/ineffective by the resolution converting circuit constituting the codec circuit of Embodiment 1.

FIG. 12 is an explanatory view showing an effective/ineffective criteria range for a contour vector used in the resolution converting circuit 12 constituting the codec circuit 1 of Embodiment 1. FIG. 12 shows a part of the vicinity of a contour in a pixel pattern after being enlarged to three times the original size. The explanatory view of FIG. 12 shows a line segment vector $a_{i \to j}$, a vector $b_{i \to j}$ and a vector $c_{i \to j}$ calculated for one contour vector (i→j).

The range indicated with the broken lines and the open arrows in FIG. 12 shows a range where a correction to a pixel value based on the distance from the line segment vector $a_{i \to j}$ is effective. Specifically, only when a pixel to be redrawn is located in a direction perpendicular to the line segment vector $a_{i \to j}$, a correction to the pixel value according to the distance d from the line segment vector $a_{i \to j}$ is effective for the pixel to be redrawn. More specifically, even when the line segment vector $a_{i \to j}$ is nearest in terms of distance to one pixel to be redrawn, the positional relationship from the center position (x, y) of the pixel to be redrawn is determined to be effective only for the line segment vector $a_{i \to j}$ satisfying conditions (called the inner product conditions) that the inner product of the line segment vector $a_{i \to j}$ and vector $b_{i \to j}$ is plus and the inner product of the line segment vector $a_{i \to j}$ and vector $c_{i \to j}$ is plus (step S17 in the flowchart shown in FIG. 10).

The above-mentioned inner product conditions are calculated by Equations (6) and (7) shown below.

$$\vec{a}_{i \to j} \cdot \vec{b}_{i \to j} = a_x * b_x + a_y * b_y \tag{6}$$

$$-\vec{a}_{i \to j} \cdot \vec{c}_{i \to j} = -a_x * c_x - a_y * c_y \tag{7}$$

For example, when the index value of a pixel pattern to be scaled is "#3" and when the resolution converting circuit 12 enlarges it to three times the original size, the resolution converting circuit 12 calculates the line segment vector $a_{2 \to 6}$ and vectors $b_{2\to6}$, $c_{2\to6}$, the line segment vector $a_{6\to10}$ and vectors $b_{6\to10}$, $c_{6\to10}$, the line segment vector $a_{10\to14}$ and vectors $b_{10\to14}$, $C_{10\to14}$ with respect to the center position (x, y) of one pixel to be redrawn. Moreover, the resolution converting circuit 12 calculates the distance d to the center position (x, y) of the pixel to be redrawn from each of the line segment vectors $a_{2\to6}$, $a_{6\to10}$, $a_{10\to14}$, and the sign of the outer product. The resolution converting circuit 12 specifies the shortest distance among the calculated distances d. For example, suppose that the resolution converting circuit 12 specifies that the line segment vector $a_{2\to6}$ has the shortest distance. In this case, however, since the resolution converting circuit 12 determines that the line segment vector $a_{2\to6}$ is a vertical vector, a correction to the pixel value according to the distance d is not made.

On the other hand, when the index value of a pixel pattern to be scaled is "#5" and when the resolution converting circuit 12 enlarges it to three times the original size, the resolution converting circuit 12 calculates the line segment vector $a_{1\to6}$ and vectors $b_{1\to6}$, $c_{1\to6}$, the line segment vector $a_{6\to11}$ and vectors $b_{6\to11}$, $c_{6\to11}$, the line segment vector $a_{11\to16}$ and vectors $b_{11\to16}$, $c_{11\to16}$ with respect to the center position (x, y) of one pixel to be redrawn. Moreover, the resolution converting circuit 12 calculates the distance d to the center position (x, y) of the pixel to be redrawn from each of the line segment vectors $a_{1\to6}$, $a_{6\to11}$, $a_{11\to16}$, and the sign of the outer product. When the pixel i in the explanatory view of FIG. 12 is pixel 1 and the pixel j is pixel 6, effectiveness/ineffectiveness of the line segment vectors $a_{1\to6}$, $a_{6\to11}$, $a_{11\to16}$ calculated with respect to the center position (x, y) of the pixel to be redrawn in the explanatory view of FIG. 12 is determined to be effective only for the line segment vector $a_{1\to6}$, and the pixel to be redrawn is corrected based on the distance d from the line segment vector $a_{1\to6}$.

Figure 13A:
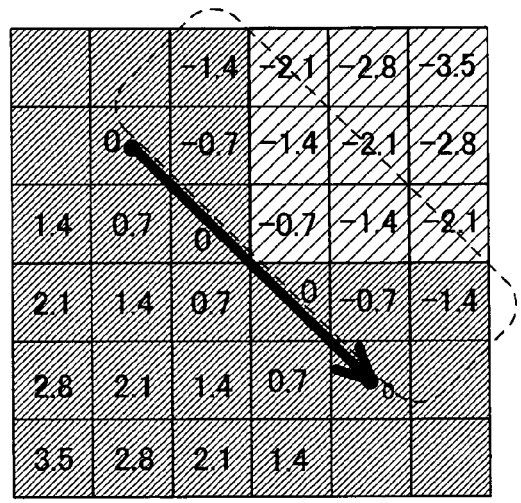
FIGS. 13A to 13C are explanatory views showing one specific example of a pixel value correction process performed by the resolution converting circuit constituting the codec circuit of Embodiment 1.
Figure 13B:
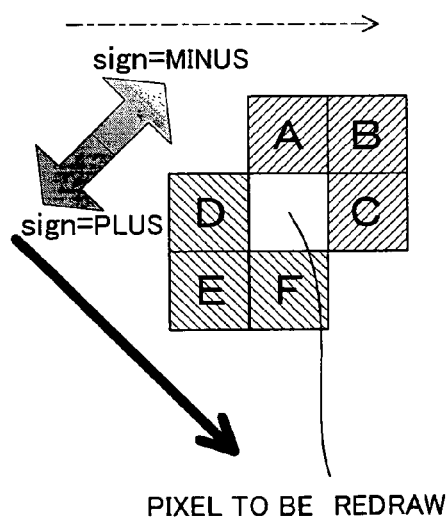
Figure 13C:
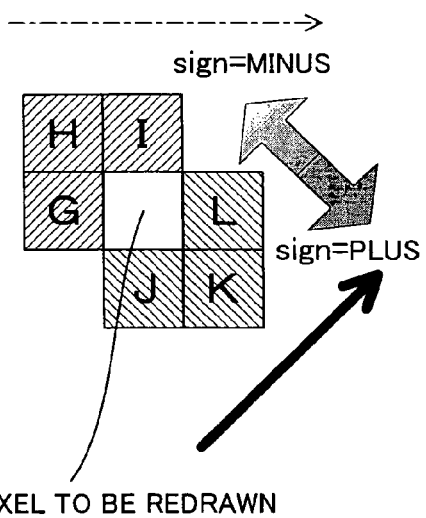

Next, the following will explain in detail the pixel value correction process performed in step S18 of the processing steps shown in the flowchart of FIG. 10 with reference to explanatory views. FIGS. 13A to 13C are explanatory views showing one specific example of the pixel value correction process performed by the resolution converting circuit 12 constituting the codec circuit 1 of Embodiment 1.

FIG. 13A shows a part of the vicinity of a contour in a pixel pattern after being enlarged to three times the original size. Each rectangle represents a pixel constituting the pixel pattern after enlargement. The thick line in FIG. 13A represents the line segment vector $a_{i\to j}$ calculated based on one contour vector, and the number in each pixel shows the distance from the line segment vector $a_{i\to j}$. Note that the distance is indicated on the basis that the length of one side in the horizontal direction of each pixel is 1. Each distance is indicated with a sign calculated based on the outer product of the line segment vector $a_{i\to j}$ and the vector $b_{i\to j}$ from the starting point of the line segment vector $a_{i\to j}$ to the center position of each pixel. Pixels indicated with distances and a minus sign are pixels located outside the contour and subjected to correction of the pixel values.

When the distance from the line segment vector $a_{i\to j}$, which is determined to be effective, exceeds ½ of the scale factor, the resolution converting circuit 12 uses a pixel value selected by the neighboring pixel interpolation method as it is without making a correction. Since the pixel pattern shown in FIG. 13A has been enlarged to three times the original size, the resolution converting circuit 12 corrects the pixel values of pixels, which are indicated with "−1.4" and "−0.7" as the distances whose absolute values are not larger than 1.5 (=3/2), in order from the largest absolute value of distance, that is, in order from the farthest pixel from the line segment vector $a_{i\to j}$.

FIGS. 13B and 13C show the pixel value correction method. FIG. 13B shows neighboring pixels used for calculating the pixel value after correcting a pixel to be redrawn when the direction of the line segment vector $a_{i\to j}$ is minus 45° with respect to the horizontal direction of the image shown by the alternate long and short dash line (minus 45° diagonal connection). On the other hand, FIG. 13C shows neighboring pixels used for calculating the pixel value after correction of a pixel to be redrawn when the direction of the line segment vector $a_{i\to j}$ is 45° with respect to the horizontal direction of the image shown by the alternate long and short dash line (45° diagonal connection).

As shown in FIG. 13B, when the direction of the line segment vector $a_{i\to j}$ is minus 45° with respect to the horizontal direction of the image shown by the alternate long and short dash line, the resolution converting circuit 12 calculates the average of the pixel values of an upper pixel A, an upper right pixel B, and a right pixel C of the pixel to be redrawn as the "negative average value". Moreover, the resolution converting circuit 12 calculates the average of the pixel values of a left pixel D, a lower left pixel E, and a lower pixel F of the pixel to be redrawn as the "positive average value". The resolution converting circuit 12 calculates the pixel value after correction by using the "negative average value" and "positive average value". Here, if any one of the upper pixel A, upper right pixel B and right pixel C, or any one of the left pixel D, lower left pixel E and lower pixel F, is a pixel to be redrawn and the pixel value has not been determined, it is excluded from the calculation of the average value.

As shown in FIG. 13C, when the direction of the line segment vector $a_{i\to j}$ is plus 45° with respect to the horizontal direction of the image shown by the alternate long and short dash line, the resolution converting circuit 12 calculates the average of the pixel values of a left pixel G, an upper left pixel H, and an upper pixel I of a pixel to be redrawn as the "negative average value". Moreover, the resolution converting circuit 12 calculates the average of the pixel values of a lower pixel J, a lower right pixel K, and a right pixel L of the pixel to be redrawn as the "positive average value". The resolution converting circuit 12 calculates the pixel value after correction by using the "negative average value" and "positive average value". Here, if any one of the left pixel G, upper left pixel H and upper pixel I, or any one of the lower pixel J, lower right pixel K and right pixel L, is a pixel to be redrawn and the pixel value has not been determined, it is excluded from the calculation of the average value.

The resolution converting circuit 12 calculates a linear sum by Equation (8) shown below by using the calculated "negative average value" and "positive average value" and the distance d as a weighting coefficient, and uses it as the pixel value after correction.

$$\frac{\text{negative average value} \times \text{distance } d + \text{positive average value} \times (\text{scale factor} \div 2 - \text{distance } d)}{\text{scale factor} \div 2} = \text{negative average value} \times \frac{2 \times d}{\text{scale factor}} + \text{positive average value} \times \left(1 - \frac{2 \times d}{\text{scale factor}}\right) \quad (8)$$

Here, when calculating the positive average value, if any one of the neighboring pixels is a pixel to be redrawn and the pixel value has not been determined, then the negative average value can be used as it is as the pixel value after correction without placing a weight based on the distance d.

Figures 14A, 14B, 14C:
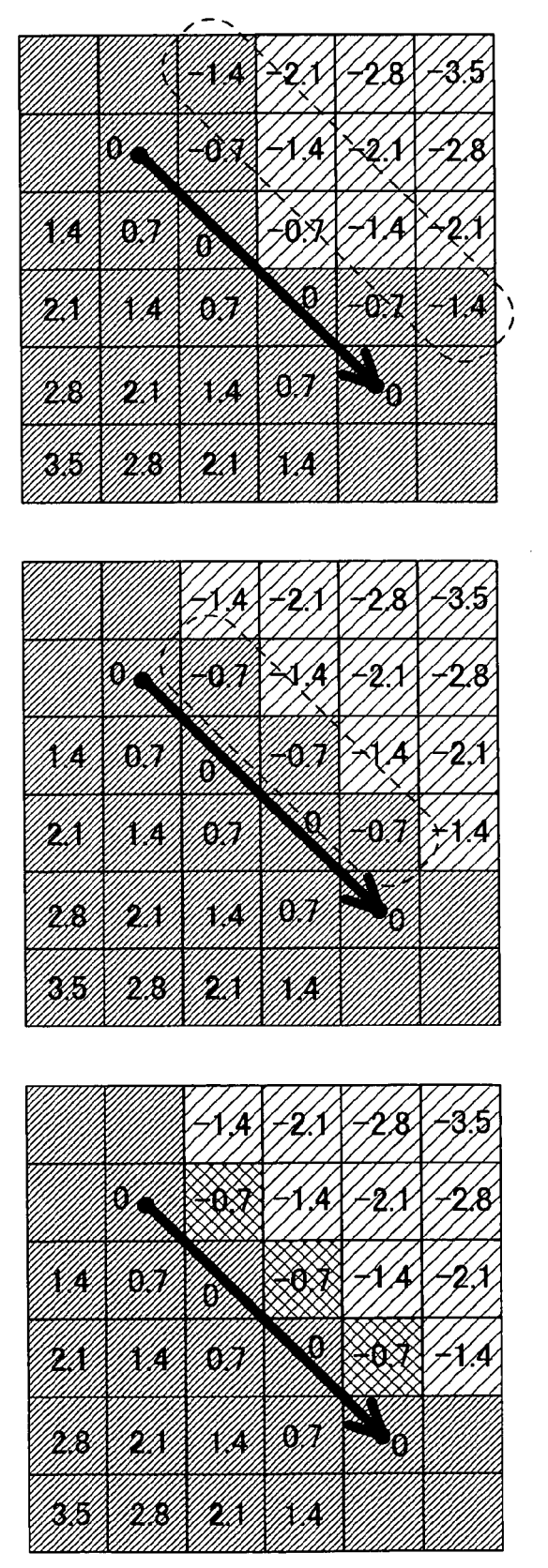

FIGS. 14A to 14C are explanatory views showing one specific example of the results of the pixel value correction process performed by the resolution converting circuit 12 constituting the codec circuit 1 of Embodiment 1. FIG. 14A in the explanatory views of FIGS. 14A to 14C shows a part of the vicinity of a contour in a pixel pattern after being enlarged to three times the original size, and shows the same example as in FIG. 13A. Each rectangle represents a pixel constituting the pixel pattern after enlargement. First, according to the above-mentioned correction method, the resolution converting circuit 12 corrects pixels which are enclosed with the broken line and indicated with "−1.4" as the distance whose absolute value is not larger than 1.5 (=3/2). The top left pixel among the pixels indicated with "−1.4" in the explanatory views of FIGS. 14A to 14C may be corrected based on other line segment vector different from a line segment vector indicated by the thick line in the explanatory views of FIGS. 14A to 14C.

FIG. 14B shows the results of the correction made to the pixels indicated with "−1.4". The pixel values (shade) of the pixels indicated with "−1.4" before correction shown in FIG. 14A are different even though the distances from the line segment vector $a_{i \to j}$ are equal. However, as shown in FIG. 14B, the pixel values (shade) became substantially equal by the correction.

Next, the resolution converting circuit 12 corrects the pixels which are enclosed with the broken line in FIG. 14B and indicated with "−0.7" as the distance. FIG. 14C shows the results of the correction made to the pixels indicated with "−0.7". The pixel values (shade) of the pixels indicated with "−0.7" before correction shown in FIGS. 14A and 14B are different even though the distances from the line segment vector $a_{i \to j}$ are equal. However, as shown in FIG. 14C, the pixel values (shade) became substantially equal by the correction. Moreover, since the pixel values were calculated by a linear sum using the distance d as a weight by Equation (8) shown above, the pixel values (shade) after the correction express an intermediate pixel value (shade) between the pixel value (shade) of a pixel indicated with "0" and the pixel value (shade) of a pixel indicated with "−1.4".

Consequently, the image is smoothly drawn with less jaggies in the contour as compared to the case where an image is scaled by simply using pixel values selected by the neighboring pixel interpolation method.

The following will illustrate an example of the results of correcting pixel values by using a pixel pattern having edge direction and associated with the contour vector information shown in the explanatory views of FIGS. 6A to 6C as an example.

Figure 15A:
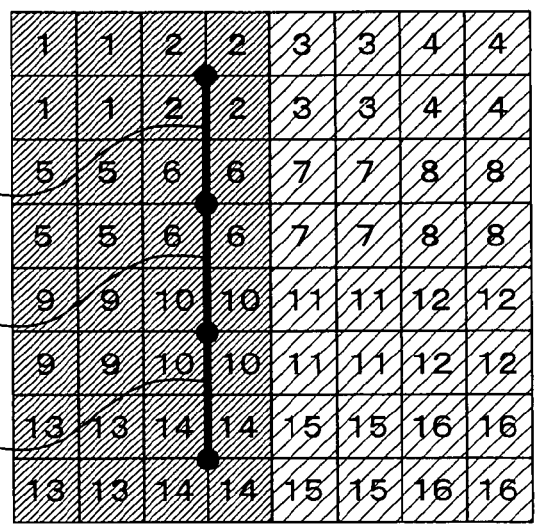
FIGS. 15A to 15C are explanatory views showing the results of correcting the pixel values by the resolution converting circuit constituting the codec circuit of Embodiment 1.
Figure 15B:
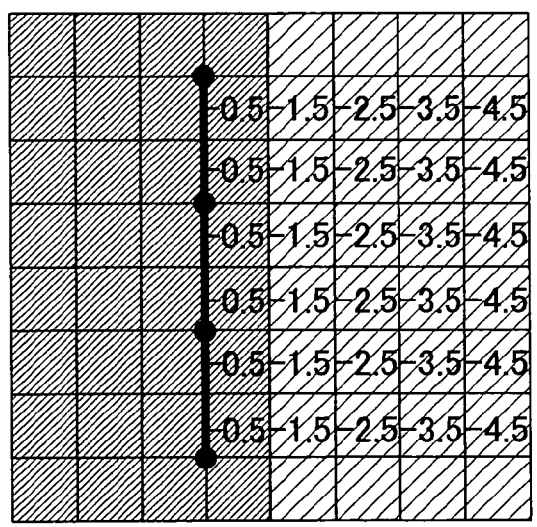
Figure 15C:
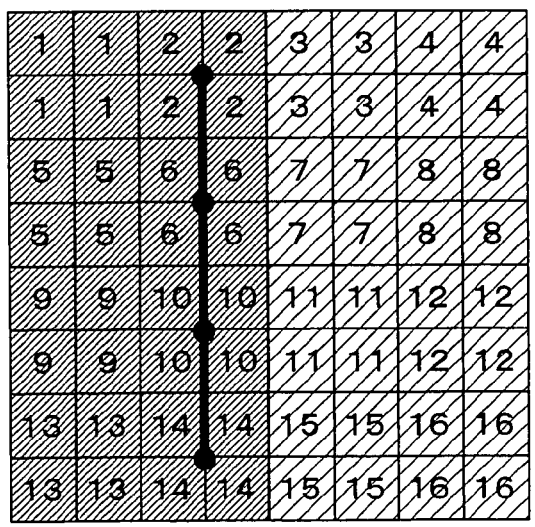

FIGS. 15A to 15C are explanatory views showing the results of correcting pixel values by the resolution converting circuit 12 constituting the codec circuit 1 of Embodiment 1. The example shown in FIGS. 15A to 15C illustrates a case where the pixel pattern "#3" shown in FIG. 6A is enlarged to twice the original size.

FIG. 15A shows the pixel pattern "#3" after being enlarged to twice the original size by the neighboring pixel interpolation method. FIG. 15A shows line segment vectors $a_{2 \to 6}$, $a_{6 \to 10}$, $a_{10 \to 14}$ calculated based on the contour vector information EV3=(2, 6, 10, 14) associated with the pixel pattern "#3".

The number in the rectangle of each pixel shown in FIG. 15B indicates the shortest distance $d_{min}$ with a sign from the line segment vector $a_{2 \to 6}$, $a_{6 \to 10}$, or $a_{10 \to 14}$ to the pixel in the pixel pattern after enlargement. FIG. 15B shows only the shortest distance $d_{min}$ with a sign for the pixels to be redrawn, which satisfy the inner product condition and are determined to be located outside the contour.

FIG. 15C shows the pixel pattern after the correction. In the pixel pattern "#3", however, all of the line segment vectors $a_{2 \to 6}$, $a_{6 \to 10}$, $a_{10 \to 14}$ having the shortest distance to the respective pixels to be redrawn are vertical vectors as shown in FIG. 15A. Therefore, a correction according to the shortest distance $d_{min}$ from each of the line segment vectors $a_{2 \to 6}$, $a_{6 \to 10}$, $a_{10 \to 14}$ is not made.

Figure 16A:
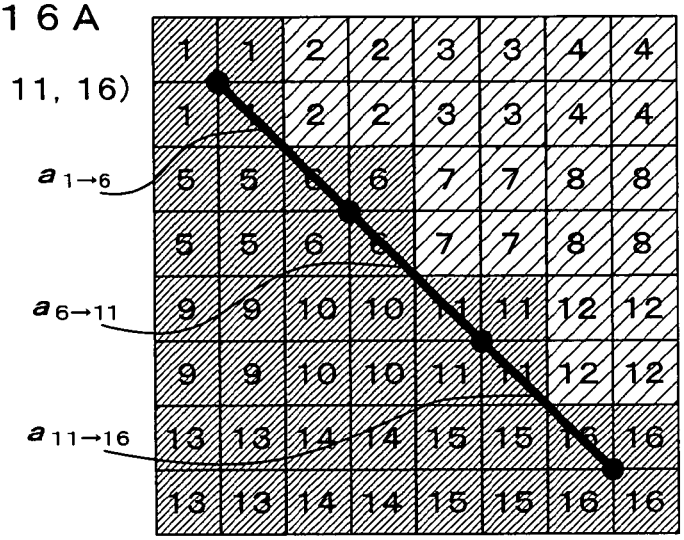
FIGS. 16A to 16C are explanatory views showing the results of correcting the pixel values by the resolution converting circuit constituting the codec circuit of Embodiment 1.
Figure 16B:
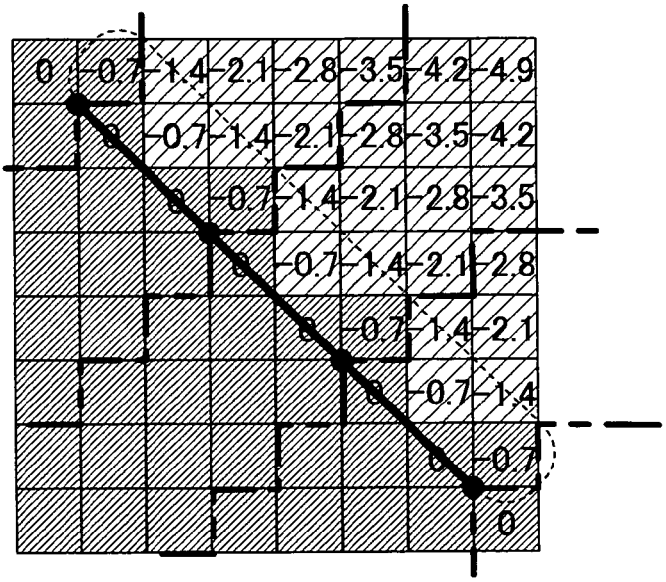
Figure 16C:
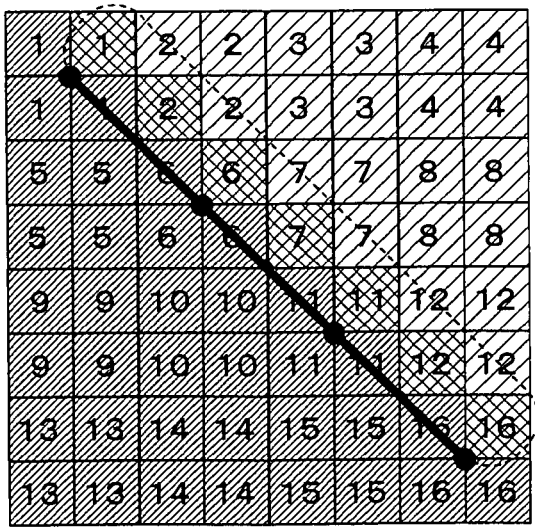

FIGS. 16A to 16C are explanatory views showing the results of correcting the pixel values by the resolution converting circuit 12 of the codec circuit 1 of Embodiment 1. The example shown in FIGS. 16A to 16C illustrates a case where the pixel pattern "#5" shown in FIG. 6B is enlarged to twice the original size.

FIG. 16A shows the pixel pattern "#5" after being enlarged to twice the original size by the neighboring pixel interpolation method. FIG. 16A shows line segment vectors $a_{1 \to 6}$, $a_{6 \to 11}$, $a_{11 \to 16}$ calculated based on the contour vector information EV5=(1, 6, 11, 16) associated with the pixel pattern "#5".

The number in the rectangle of each pixel shown in FIG. 16B indicates the shortest distance $d_{min}$ with a sign from the line segment vector $a_{1 \to 6}$, $a_{6 \to 11}$, or $a_{11 \to 16}$ to the pixel in the pixel pattern after enlargement. FIG. 16B shows only the shortest distance $d_{min}$ with a sign for pixels to be redrawn, which satisfy the inner product condition and are determined to be located outside the contour. The alternate long and short dash lines in FIG. 16B show the boundaries of the effective range from the respective line segment vectors $a_{1 \to 6}$, $a_{6 \to 11}$, $a_{11 \to 16}$. The pixel values of pixels enclosed with the broken line in FIG. 16B, which satisfy a condition that the absolute value of distance d≦1.0 (=scale factor/2=2/2) and are determined to be located outside the contour, are corrected based on the pixel values of neighboring pixels and the weighting of the shortest distances $d_{min}$ from the respective line segment vectors $a_{1 \to 6}$, $a_{6 \to 11}$, $a_{11 \to 16}$.

FIG. 16C shows the pixel pattern after the correction. The pixel values of the pixels enclosed with the broken line in FIG. 16C were corrected according to the pixel values of neighboring pixels and the shortest distances $d_{min}$ from the respective line segment vectors $a_{1 \to 6}$, $a_{6 \to 11}$, $a_{11 \to 16}$. It is particularly shown that the pixel values of pixels indicated with distance "−0.7" (0.7≦1.0) from the respective line segment vectors were corrected and the pixels were smoothly drawn according to the distances.

Figure 17A:
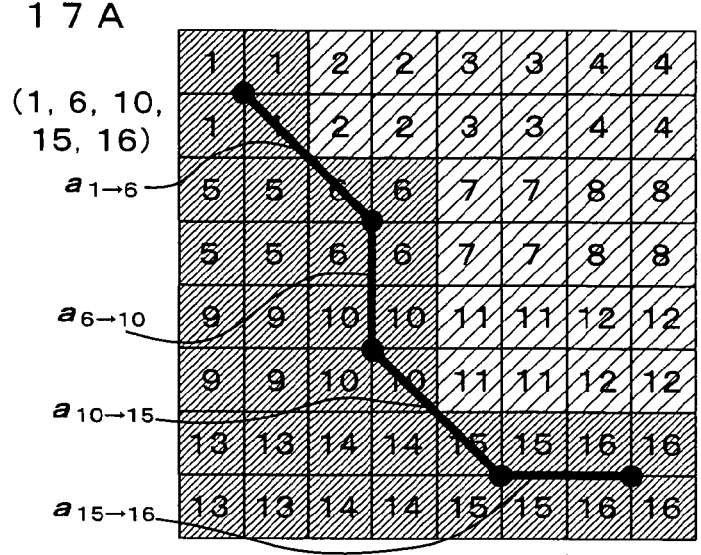
FIGS. 17A to 17C are explanatory views showing the results of correcting the pixel values by the resolution converting circuit constituting the codec circuit of Embodiment 1.
Figure 17B:
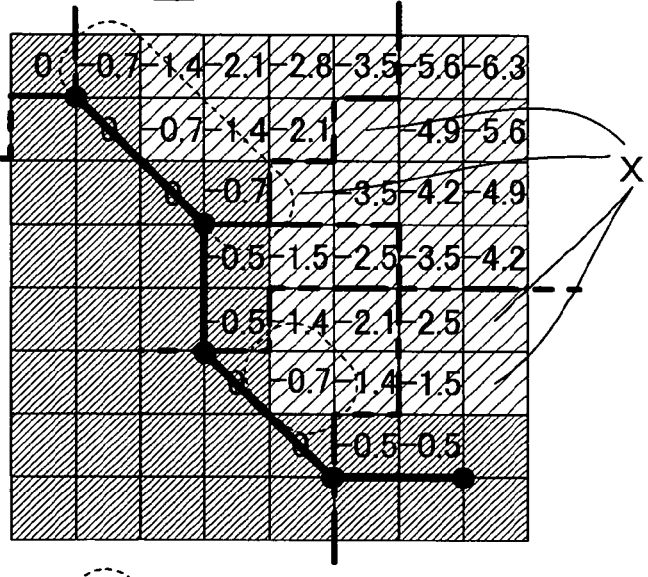
Figure 17C:
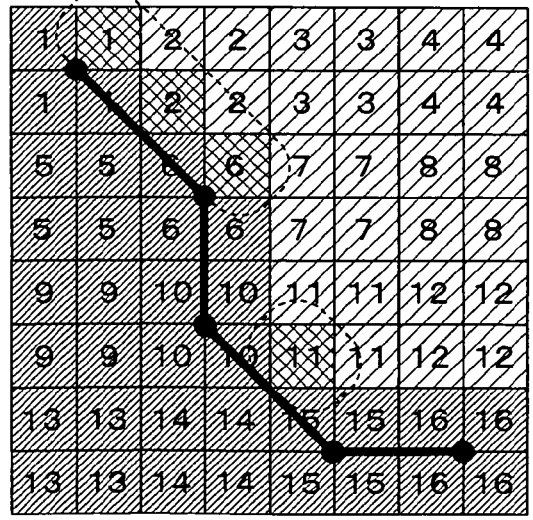

FIGS. 17A to 17C are explanatory views showing the results of correcting the pixel values by the resolution converting circuit 12 of the codec circuit 1 of Embodiment 1. The example shown in FIGS. 17A to 17C illustrates a case where the pixel pattern shown in FIG. 6C is enlarged to twice the original size.

FIG. 17A shows the pixel pattern after being enlarged to twice the original size by the neighboring pixel interpolation method. FIG. 17A shows line segment vectors $a_{1 \to 6}$, $a_{6 \to 10}$, $a_{10 \to 15}$, $a_{15 \to 16}$ calculated based on the contour vector information EVN=(1, 6, 10, 15, 16) associated with the pixel pattern.

The number in the rectangle of each pixel shown in FIG. 17B indicates the shortest distance $d_{min}$ with a sign from the line segment vectors $a_{1 \to 6}$, $a_{6 \to 10}$, $a_{10 \to 15}$, or $a_{15 \to 16}$ to the pixel in the pixel pattern after enlargement. FIG. 17B shows only the shortest distance $d_{min}$ with a sign for pixels to be redrawn which satisfy the inner product condition and are determined to be located outside the contour. The pixels indicated by X in FIG. 17B are pixels where the line segment vectors at the shortest distance do not satisfy the inner product condition. Therefore, for a pixel X, a pixel value selected by the neighboring pixel interpolation method is used as it is.

Figure 18A:
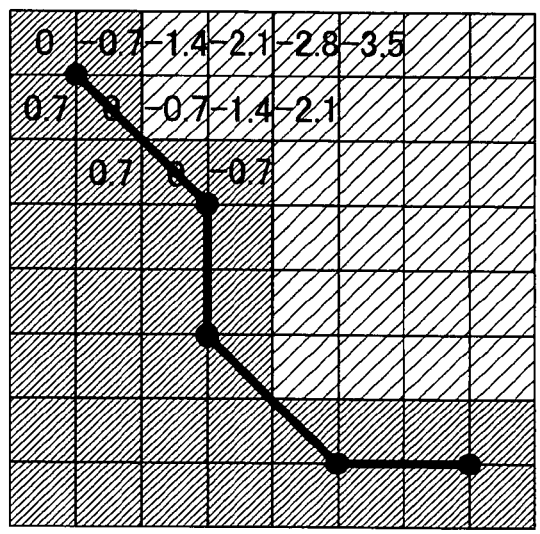
FIGS. 18A to 18C are explanatory views showing a correction process performed based on each line segment vector by the resolution converting circuit constituting the codec circuit of Embodiment 1.
Figure 18B:
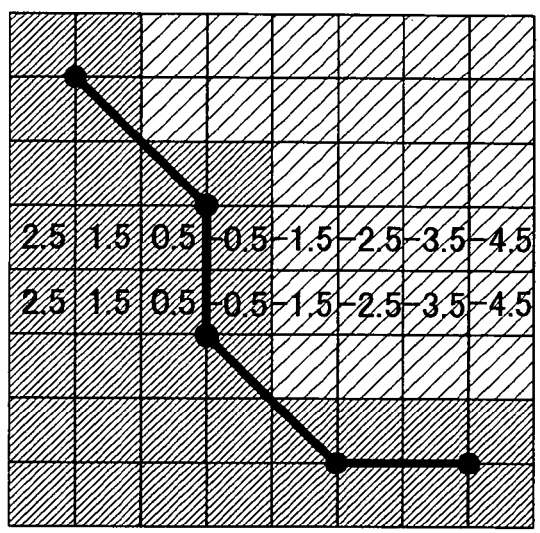
Figure 18C:
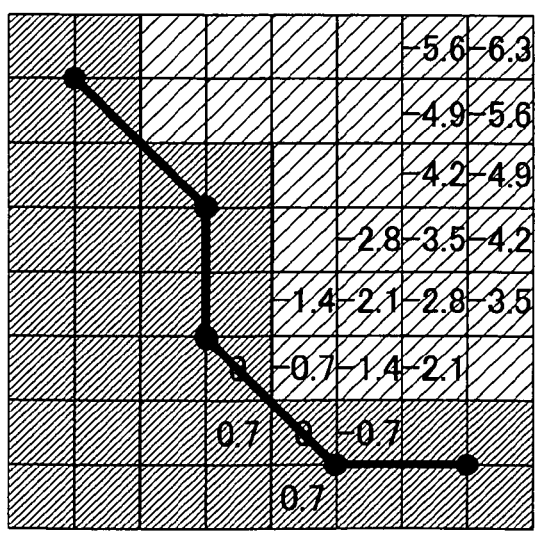

The alternate long and short dash lines in FIG. 17B show the boundaries of the range where distances are calculated based on the respective line segment vectors $a_{1 \to 6}$, $a_{6 \to 10}$, $a_{10 \to 15}$, $a_{15 \to 16}$. FIGS. 18A to 18C are explanatory views showing the correction process performed based on each line segment vector by the resolution converting circuit 12 of the codec circuit 1 of Embodiment 1. The examples shown in FIGS. 18A to 18C indicate the distances from the respective line segment vectors $a_{1 \to 6}$, $a_{6 \to 10}$, $a_{10 \to 15}$, $a_{15 \to 16}$ shown in FIG. 17B. The resolution converting circuit 12 calculates the distances from the respective line segment vectors $a_{1 \to 6}$, $a_{6 \to 10}$, $a_{10 \to 15}$, $a_{15 \to 16}$ as shown in FIGS. 18A to 18C, and specifies the shortest distance $d_{min}$ among them.

Returning to FIGS. 17A to 17C, the explanation will continue. The pixel values of pixels enclosed with the broken line in FIG. 17B, which satisfy that absolute value of distance $d \leq 1.0$ (=scale factor/2=2/2) and are determined to be located outside the contour, are corrected based on the pixel values of neighboring pixels and the weighting of the distances from the respective line segment vectors $a_{1 \to 6}$, $a_{10 \to 15}$. Note that since the line segment vectors $a_{6 \to 10}$, $a_{15 \to 16}$ are a vertical vector and a horizontal vector, a correction according to the distances from the line segment vectors $a_{6 \to 10}$, $a_{15 \to 16}$ is not made.

FIG. 17C shows the pixel pattern after the correction. The pixel values of pixels enclosed with the broken lines in FIG. 17C are corrected based on the pixel values of neighboring pixels and the distances from the respective line segment vectors $a_{1 \to 6}$, $a_{10 \to 15}$. It is particularly shown that the pixel values of pixels indicated with distance "−0.7" ($0.7 \leq 1.0$) from the line segment vector $a_{1 \to 6}$ or $a_{10 \to 15}$ were corrected and the pixels were smoothly drawn according to the distances.

Figure 19A:
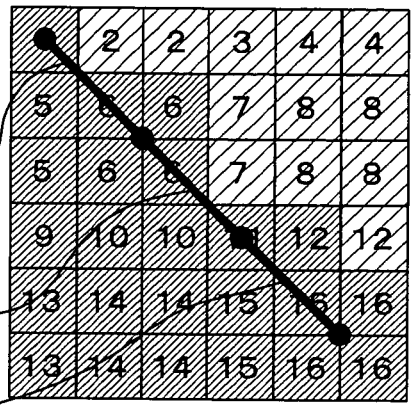
FIGS. 19A to 19C are explanatory views showing the results of correcting the pixel values by the resolution converting circuit constituting the codec circuit of Embodiment 1.
Figure 19B:
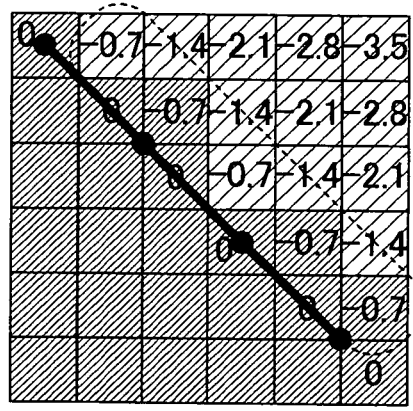
Figure 19C:
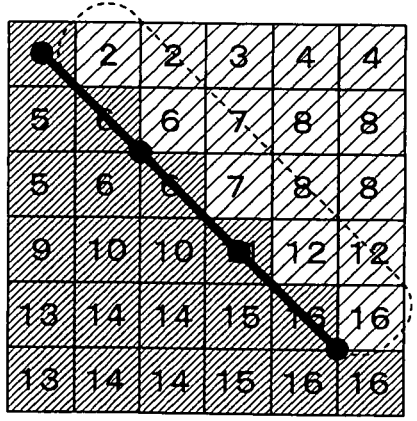

FIGS. 19A to 19C are explanatory views showing the results of correcting the pixel values by the resolution converting circuit 12 of the codec circuit 1 of Embodiment 1. The example shown in FIGS. 19A to 19C illustrates a case where the pixel pattern "#5" shown in FIG. 6B is enlarged to 1.5 times the original size.

FIG. 19A shows the pixel pattern "#5" after being enlarged to 1.5 times the original size by the neighboring pixel interpolation method. FIG. 19A shows line segment vectors $a_{1 \to 6}$, $a_{6 \to 11}$, $a_{11 \to 16}$ calculated based on the contour vector information EV5:=(1, 6, 11, 16) associated with the pixel pattern "#5".

The number in the rectangle of each pixel shown in FIG. 19B indicates the shortest distance $d_{min}$ with a sign from the line segment vector $a_{1 \to 6}$, $a_{6 \to 11}$, or $a_{11 \to 16}$ to the pixel in the pixel pattern after enlargement. FIG. 19B shows only the shortest distance $d_{min}$ with a sign for pixels to be redrawn which satisfy the inner product condition and are determined to be located outside the contour. The alternate long and short dash line in FIG. 19B shows the boundary of the range where distances are calculated based on the respective line segment vectors $a_{1 \to 6}$, $a_{6 \to 11}$, $a_{11 \to 16}$. The pixel values of pixels enclosed with the broken line in FIG. 19B which satisfy the absolute value of distance $d \leq 0.75$ (=scale factor/2=1.5/2) and are determined to be located outside the contour are corrected based on the pixel values of neighboring pixels and the weighting of the shortest distances $d_{min}$ from the respective line segment vectors $a_{1 \to 6}$, $a_{6 \to 11}$, $a_{11 \to 16}$.

FIG. 19C shows the pixel pattern after the correction. The pixel values of pixels enclosed with the broken line in FIG. 19C were corrected according to the pixel values of neighboring pixels and the shortest distances $d_{min}$ from the respective line segment vectors $a_{1 \to 6}$, $a_{6 \to 11}$, $a_{11 \to 16}$. It is particularly shown that the pixel values of pixels indicated with distance "−0.7" ($0.7 \leq 0.75$) from the respective line segment vectors were corrected and the pixels were smoothly drawn according to the distances.

FIGS. 20A and 20B are explanatory views showing examples of the contents of an image scaled by the codec circuit 1 of Embodiment 1. FIG. 20A shows for a comparison purpose an image enlarged to four times the original size by linear interpolation. On the other hand, FIG. 20B shows an image enlarged to four times the original size by the process performed by the resolution converting circuit 12 constituting the codec circuit 1.

In this embodiment, as shown in FIG. 20B, even when the image is enlarged or reduced, it is possible to realize smooth drawing along the contour direction without jaggies as compared to the case of FIG. 20A where only simple linear interpolation was performed. Since the codec circuit 1 in Embodiment 1 scales each pixel pattern without scaling the entire image after decoding, it is possible to perform the processing at high speed. Moreover, the codec circuit 1 redraws pixels near the contour based on the contour vector information corresponding to each pixel pattern without detecting the contour and recalculating the smoothed contour after decoding the entire image. Thus, the present invention exhibits such an advantageous effect that it is possible to realize scaling together with further smooth contour drawing by high-speed processing.

In Embodiment 1, when redrawing a pixel to be redrawn, the codec circuit 1 determines whether the pixel is located outside or inside the contour, and corrects only the pixel to be redrawn which is located outside the contour. Hence, it is possible to improve the correction accuracy by correcting only a portion which is easily and sensitively perceived by the human eye, such as jaggies outside a contour, and avoiding unnecessary correction to other portions.

Moreover, when redrawing a pixel to be redrawn, the codec circuit 1 determines whether a correction based on a line segment vector corresponding to a contour is effective or ineffective based on whether or not the inner product condition with respect to the line segment vector is satisfied, and the correction is made only when the correction is determined to be effective. Hence, it is possible to realize a more accurate correction and smooth drawing without making a correction based only on the distance from the contour.

Further, the codec circuit 1 may be configured to perform scaling by the following processes. For each pixel pattern stored in the storage section 13, indices of a group of pixel patterns constructing a pixel pattern after scaling are added for each scale factor such as 2 or 3, for example, as the information about pixel patterns having the scaled relationship.

FIGS. 21A and 21B are explanatory views showing an example of the contents of pixel patterns having the scaled relationship stored in the storage section 13 of the codec circuit 1 of Embodiment 1. FIG. 21A illustrates an example in which the pixel pattern after scaling is composed of other pixel patterns, and FIG. 21B shows an example of pixel patterns having the scaled relationship by a factor of 2 with the pixel pattern shown in FIG. 21A.

As shown in FIG. 21A, it can be said that the pixel pattern after enlarging the pixel pattern "#5" shown in the explanatory view of FIG. 4 to twice the original size, for example, is composed of the pixel patterns "#5", "#11", "#12" and "#5". Accordingly, in the storage section 13, as shown in FIG. 21B, a group of indices of pixel patterns having a scaled relationship by a factor of 2 is stored in association with each pixel pattern. Of course, a group of indices of pixel patterns having a scaled relationship by a factor of 3, 4 etc. instead of 2 can be stored in association with each pixel pattern in the storage section 13.

Figure 22:
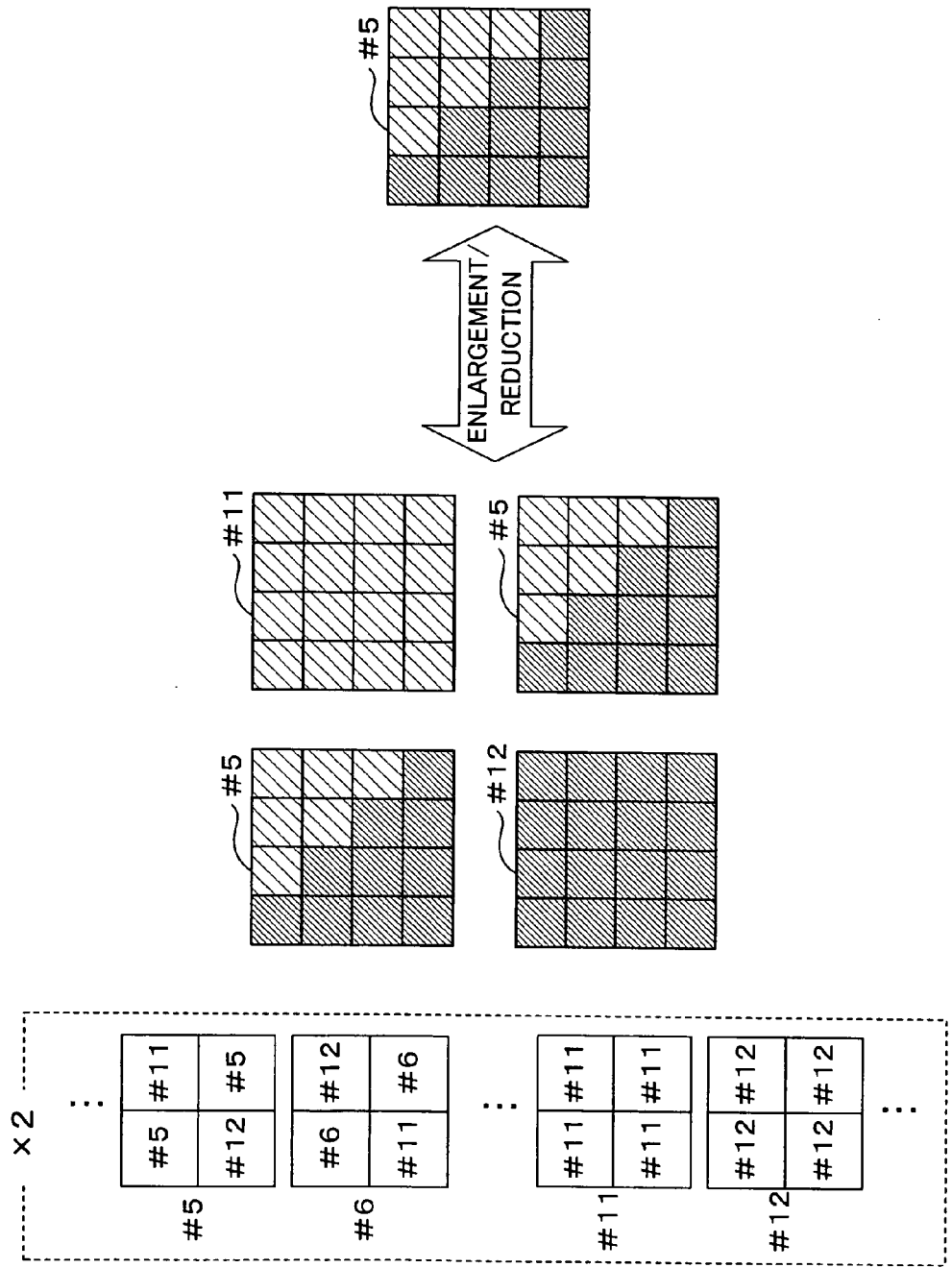
FIG. 22 is an explanatory view showing a contour of a scaling process performed by the resolution converting circuit constituting the codec circuit of Embodiment 1.

FIG. 22 is an explanatory view showing a contour of a scaling process performed by the resolution converting circuit 12 constituting the codec circuit 1 of Embodiment 1. The explanatory view of FIG. 22 shows the relationship between pixel patterns when scaled by a factor of 2, which is used with a scale factor of 2 or 0.5, and pixel patterns used by the scaling process.

When the pixel pattern decoded by the vector quantization decoding circuit 10 is "#5" and enlargement is performed by a scale factor of 2, the resolution converting circuit 12 produces an image after enlargement by using the pixel patterns "#5", "#11", "#12" and "#5" having the scaled relationship by a factor of 2 with the "#5" pixel pattern, and outputs the image.

When a 2×2 pixel pattern decoded by the vector quantization decoding circuit 10 is composed of the "#5", "#11", "#12" and "#5" pixel patterns and reduction is performed by a scale factor of 0.5, the resolution converting circuit 12 searches for a pixel pattern having a scaled relationship by a factor of 2 with the "#5", "#11", "#12" and "#5" pixel patterns. The resolution converting circuit 12 finds that the "#5" pixel pattern has a scaled relationship by a factor of 2 with the 2×2 pixel pattern composed of the "#5", "#11", "#12" and "#5" pixel patterns, and outputs the "#5" pixel pattern as a result of reduction by a factor of 0.5. Note that an LUT (Look Up Table) showing pixel patterns having a scaled relationship of each scale factor may be stored in the storage section 13, and the resolution converting circuit 12 may be designed to perform the scaling process as shown in the explanatory view of FIG. 22 by referring to the LUT.

By executing the resolution conversion process together with the process shown in FIG. 22 and the above-mentioned redrawing process based on the contour vector information, the resolution converting circuit 12 constituting the codec circuit 1 can perform the scaling process to which vector quantization is applied and realize drawing processing at high speed after decompression without calculating line segment vectors according to a scale factor especially when the scale factor is an integer number.

Embodiment 2

Embodiment 2 explains, as an example, a case where this embodiment is applied to a display apparatus which decodes an index image obtained by encoding an image containing characters etc. by using vector quantization, and displays the decoded image. The display apparatus of Embodiment 2 comprises the codec circuit 1 explained in Embodiment 1, decodes an image using the codec circuit 1, scales the image, and displays the image.

Since the codec circuit 1 included in the display apparatus of Embodiment 2 is the same as the codec circuit 1 of Embodiment 1, the detailed explanation thereof is omitted by assigning the same codes.

Figure 23:
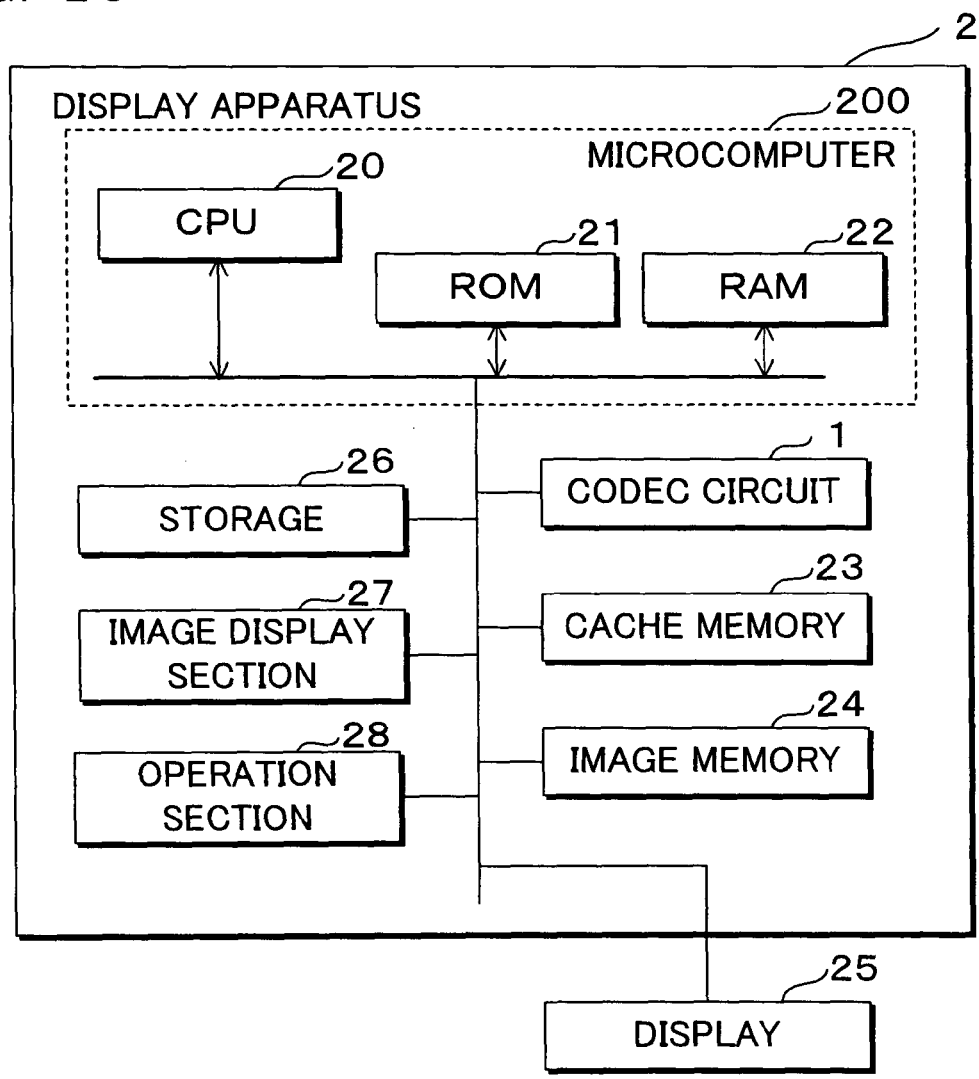
FIG. 23 is a block diagram showing the structure of a display apparatus of Embodiment 2.

FIG. 23 is a block diagram showing the structure of the display apparatus 2 of Embodiment 2. The display apparatus 2 comprises a microcomputer 200 including a CPU (Central Processing Unit) 20, a ROM 21 and a RAM (Random Access Memory) 22; a codec circuit 1; a cache memory 23; an image memory 24; a display 25; a storage 26; an image display section 27; and an operation section 28. The display apparatus 2 performs processing in the respective component sections to read an index image encoded using a vector quantization technique from the storage 26 and display it on the display 25.

By reading a control program stored in the ROM 21 into the RAM 22 and executing it, the CPU 20 controls the respective component sections and realizes the operation as the display apparatus 2. The ROM 21 uses a memory, such as a mask ROM, a PROM, an EPROM, and an EPROM. In the ROM 21, not only the above-mentioned control program, but also fixed data such as fonts are stored. The ROM 22 uses a memory, such as a DRAM (Dynamic Random Access Memory), and an SRAM (Static Random Access Memory). The RAM 22 stores temporarily various kinds of information generated by the processing performed by the CPU 20, for example, inputted data, page data, and font data obtained from outside.

By inputting an unencoded image into the codec circuit 1, the CPU 20 can obtain an index image encoded using vector quantization. On the other hand, by inputting an index image into the codec circuit 1, the CPU 20 can obtain a decoded image. In order to scale the image and display it on the display 25, the CPU 20 inputs a scale factor into the codec circuit 1. Accordingly, the CPU 20 can obtain the decoded image scaled by a desired scale factor and having smooth contours.

The cache memory 23 is a storage area using a RAM, such as a DRAM and an SRAM, where the decoded image obtained from the codec circuit 1 by the CPU 20 is temporarily stored.

The image memory 24 is a storage area using a RAM for writing an image, such as bit map data, to be displayed on the display 25.

The storage 26 is a storage area using a storage medium, such as a hard disk, for accumulating image data before encoding and an index image after encoding, or the like. The image data can be document data including pictures, graphics and text, and page data such as a Web page.

The image display section 27 uses a GPU (Graphics Processing Unit), and controls writing to the image memory 24 for displaying the image on the display 25. The image display section 27 may have a function of writing an image to the image memory 24 by performing processing appropriate for displaying the image on the display 25, such as conversion of color space, and adjustment of gray levels of pixel values. The CPU 20 outputs the decoded image data (bit map data) stored in the cache memory 23 to the image display section 27. The image display section 27 writes the image outputted from the cache memory 23 by the CPU 20 into the image memory 24 and outputs it to the display 25.

The display 25 (image display means, image display section) uses a liquid crystal panel and displays the image based on the image data outputted by the image display section 27. The display 25 may use a PDP (Plasma Display Panel), an organic EL (Electroluminescence), an FED (Field Emitting Display) etc. instead of the liquid crystal panel.

The operation section 28 is a user interface, such as a remote controller, a mouse, and buttons for receiving the user's operation. The user can select an image to be displayed through the operation section 28. When the operation section 28 detects the user's operation, it notifies the CPU 20 of this and the selected image. The operation section 28 is also capable of receiving the user's scaling operation. The CPU 20 calculates a scale factor corresponding to the scaling operation performed by the user through the operation section 28, and inputs a signal indicating the scale factor to the codec circuit 1.

When the CPU 20 receives the notification about the selected image from the operation section 28, it reads an index image corresponding to the selected image from the storage 26. The CPU 20 decodes the read index image by the coded circuit 1, and inputs the decoded image data (bit map data) outputted from the codec circuit 1 to the image display section 27. When the user performs the scaling operation, the CPU 20 inputs a signal indicating a corresponding scale factor into the codec circuit 1. Hence, the resolution conversion process according to the scale factor is performed by the resolution converting circuit 12 constituting the codec circuit 1, and the decoded image is outputted.

It is also possible that the CPU 20 performs resolution conversion on the decoded image from the cache memory 23, according to a desired scale factor, in a conventional manner. In this case, however, since the process of detecting a contour is further needed, it is difficult to perform the resolution conversion process which enables smooth drawing at high speed. Moreover, it is possible that the CPU 20 reads font data etc. from the RAM 22 and performs resolution conversion by expanding the image again in the cache memory 23 according to a desired scale factor. In this case, however, since a processing time is needed, it is difficult to realize high-speed processing.

On the other hand, in the display apparatus 2 of Embodiment 2, since the decoded image outputted from the codec circuit 1 has already been scaled by a desired scale factor, the CPU 20 can just input the image outputted from the codec circuit 1 to the image display section 27. The CPU 20 stores the index image in the cache memory 23 while displaying the image on the display 25, and calculates, whenever the operation section 28 detects a scaling operation performed by the user, a scale factor corresponding to the scaling operation and inputs the calculated scale factor and the index image to the codec circuit 1. Thus, it is possible to decode the index image at high speed, execute the resolution conversion process and realize multi-scalable drawing without detecting contours and calculating smoothed contour vectors whenever the scaling operation is performed.

In Embodiment 2, the CPU 20 outputs the decoded image, which went through the resolution conversion process and was outputted from the codec circuit 1, to the cache memory 23 and inputs the image to the image display section 27 for displaying it on the display 25. However, this embodiment is not limited to this, and it is possible to configure the structure without the cache memory 23 so that the decoded image which is outputted from the codec circuit 1 after the resolution conversion process is directly outputted to the image memory 24. With this structure, it is possible to realize multi-scalable drawing at higher speed.

Embodiment 3

Embodiment 3 explains an example in which this embodiment is applied to an image forming apparatus which decodes an index image obtained by encoding an image containing characters etc. by vector quantization and forms the image on a sheet. The image forming apparatus in Embodiment 3 comprises a codec circuit 1 illustrated in Embodiment 1, and decodes and scales an image by using the codec circuit 1 to form an image.

Since the codec circuit 1 included in the image forming apparatus of Embodiment 3 is the same as the codec circuit 1 of Embodiment 1, the detailed explanation thereof is omitted by assigning the same codes.

Figure 24:
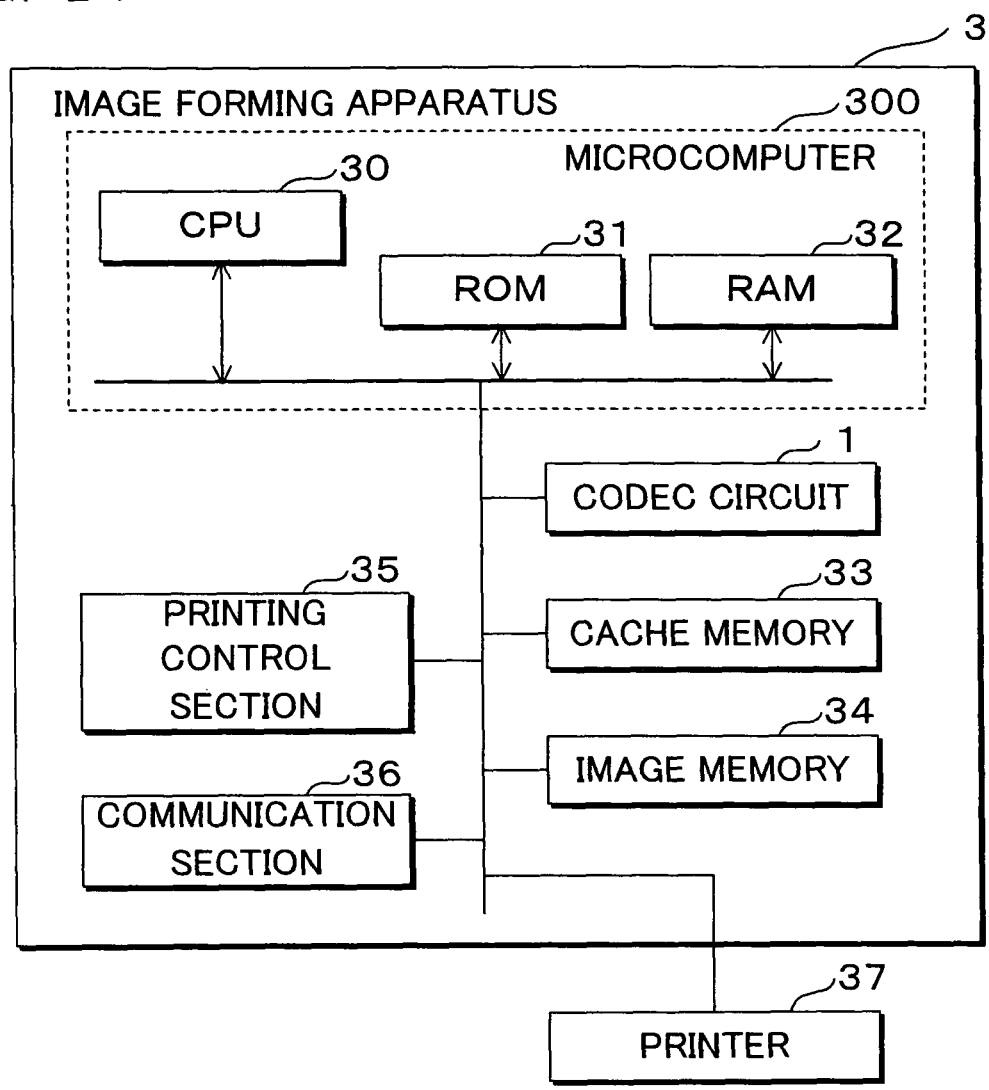
FIG. 24 is a block diagram showing the structure of an image forming apparatus of Embodiment 3.

FIG. 24 is a block diagram showing the structure of an image forming apparatus 3 of Embodiment 3. The image forming apparatus 3 comprises a microcomputer 300 including a CPU 30, a ROM 31 and a RAM 32; a codec circuit 1; a cache memory 33; an image memory 34; a printing control section 35; a communication section 36; and a printer 37 for performing actual printing. The image forming apparatus 3 receives the image of print image, including a document, a picture, a graphic etc., from a computer apparatus such as a PC (Personal Computer) operated by a user through the communication section 36, and performs processing in the respective component sections to print the image with the printer 37.

By reading a control program stored in the ROM 31 into the RAM 32 and executing it, the CPU 30 controls the respective component sections and realizes the operation as the image forming apparatus 3. The ROM 31 uses a memory, such as a mask ROM, a PROM, an EPROM, and an EEPROM. In the ROM 31, not only the above-mentioned control program, but also fixed data such as fonts are stored. The RAM 32 uses a memory, such as a DRAM and an SRAM. The RAM 32 stores temporarily various kinds of information generated by the processing in the CPU 30, for example, data and page data received from the communication section 36, and font data obtained from outside.

By inputting an unencoded print image (image) into the codec circuit 1, the CPU 30 can obtain an index image encoded using vector quantization. On the other hand, by inputting an index image into the codec circuit 1, the CPU 30 can obtain a decoded image. In order to scale the image and print the scaled image with the printer 37, the CPU 30 inputs into the codec circuit 1 a scale factor which can be received from the communication section 36 according to the user's instruction. Thus, the CPU 30 can obtain the decoded image which was scaled by a desired scale factor and has smooth contours.

The cache memory 33 is a storage area using a RAM, such as a DRAM and an SRAM, for temporarily storing an image received by the CPU 30 through the communication section 36. As to be described later, when expanding the received image to the cache memory 33, the CPU 30 encodes the image into an index image by the codec circuit 1 and then expands the image to the cache memory 33. Hence, it is possible to reduce the capacity of the cache memory 33.

The image memory 34 is a storage area using a RAM for writing an image, such as bit map data, to be outputted to the printer 37.

The print control section 35 controls writing to the image memory 34 for outputting the decoded image-data (bit map data) to the printer 37, and may also have a function of writing the image in the image memory 34 after performing predetermined image processing, such as conversion of color space, removal of color impurity, half-tone correction, to correct the image to be suitable for image formation with the printer 37. According to an instruction from the CPU 30, the printing control section 35 writes the decoded and scaled image outputted from the codec circuit 1 to the image memory 34, performs predetermined image processing, and outputs the image to the printer 37 (image forming means, image forming section).

The printer 37 is an electro-photographic printer, an inkjet type printer, etc., and forms the image outputted from the printing control section 35 on a sheet.

When the CPU 30 receives an image through the communication section 36, it inputs the image to the codec circuit 1, and temporarily stores the outputted index image in the cache memory 33. According to the user's instruction received through the communication section 36, the CPU 30 reads the index image from the cache memory 33 and inputs it to the codec circuit 1 together with a signal indicating a scale factor included in the instruction received through the communication section 36. The CPU 30 writes the decoded image (bit map data) outputted from the codec circuit 1 into the image memory 34. Consequently, the decoded image which went through the resolution conversion process according to the scale factor in the resolution converting circuit 12 constituting the codec circuit 1 is outputted to the printer 37.

In the image forming apparatus 3 of Embodiment 3, since the decoded image data outputted from the codec circuit 1 has already been scaled by a desired scale factor, the CPU 30 can just write the image outputted from the codec circuit 1 into the image memory 34 under the control of the printing control section 35. Thus, image formation by smooth drawing is realized by high-speed processing.

Note that the printer 37 in Embodiment 3 can be constructed as a digital complex machine having a copy-function and a facsimile function.

Embodiment 4

In Embodiments 1 to 3, the image processing apparatus according to each embodiment is realized as hardware using an integrated circuit. However, this embodiment is not limited to these embodiments, and may be embodied as software by implementing the resolution conversion process using the contour vector information together with the encoding process and decoding process using a vector quantization technique, based on a computer program.

In Embodiment 4, a program code (an executable program, an intermediate code program, and a source program, hereinafter referred to as a control program) to be executed by a computer is configured to direct the computer to perform the resolution conversion process using the contour vector information, and further the control program is stored in a computer-readable storage medium. Thus, it is possible to provide a removable storage medium storing the control program for an image processing method capable of scaling an image by smooth drawing without performing complicated operations such as contour detection.

Figure 25:
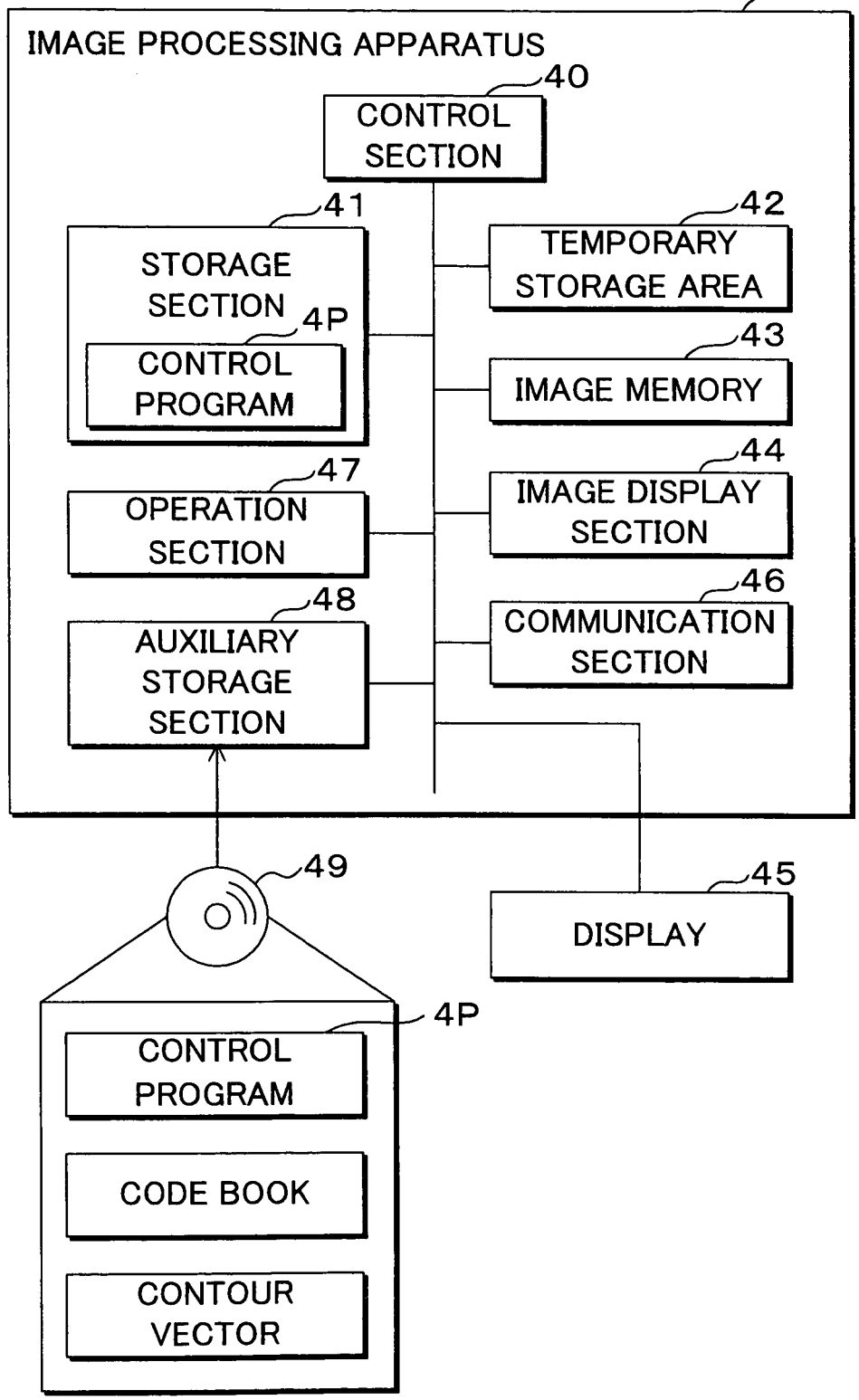
FIG. 25 is a block diagram showing the structure of an image processing apparatus of Embodiment 4.

FIG. 25 is a block diagram showing the structure of an image processing apparatus 4 of Embodiment 4. The image processing apparatus 4 is composed of a computer apparatus such as a PC (Personal Computer), and comprises a control section 40 using a CPU for controlling the respective component sections; a storage section 41 using a hard disk; a temporary storage area 42 and an image memory 43 using a DRAM and an SRAM; an image display section 44 using a GPU; a display 45 using a liquid crystal panel; a communication section 46 using a network card; an operation section 47 which is an input interface such as a mouse and a keyboard; and an auxiliary storage section 48 capable of reading data from a storage medium 49 such as a CD-ROM and a DVD-ROM.

By reading a control program 4P stored in the storage section 41 into the temporary storage area 42 and executing it, the control section 40 operates the computer apparatus as an image processing apparatus 4. The temporary storage area 42 temporarily stores information generated in each processing executed by the control section 40. For example, data, page data, and font data obtained through the communication section 46 are stored in the temporary storage area 42.

Stored in the storage section 41 is the control program 4P configured to perform the above-mentioned vector quantization encoding/decoding process and the resolution conversion process using the contour vector information. In the storage section 41, the code book shown in the explanatory view of FIG. 3 of Embodiment 1 and contour vector information corresponding to the respective pixel patterns contained in the code book are stored. Moreover, in the storage section 41, an image before encoding and index images after encoding etc. are accumulated, and fixed data such as fonts are stored. The image may be document data including pictures, graphics and text, or page data such as a Web page.

The image memory 43 is a storage area for writing the decoded image (such as bit map data) to be displayed on the display 45. The image display section 44 uses a GPU and controls writing to the image memory 43 for displaying the image on the display 45, and may also have a function of performing image processing, such as conversion of color space, elimination of noise and adjustment of gray levels of pixel values, to correct the image to be suitable for the display 45. When the control section 40 outputs the decoded and scaled image to the image display section 44, the image display section 44 writes the decoded image data into the image memory 43 and outputs the image data to the display 45.

The display 45 displays the image based on the image data outputted by the image display section 44. For the display 45, it is possible to use a PDP, an organic EL, an FED, etc. instead of a liquid crystal display.

The communication section 46 realizes data communication with an external apparatus through a LAN (Local Area Network), the Internet etc. The CPU can obtain document data, Web pages, pictures, and image data from outside through the communication section 46.

The operation section 47 receives an operation performed by the user. The user can select an image to be displayed through the operation section 47. When the operation section 47 detects the operation performed by the user, it notifies the control section 40 of this and the selected image. The operation section 47 is also capable of receiving a scaling operation performed by the user. The user can perform a scaling operation on an image by operating buttons and bars on a window of an image display application displayed on the display 45 by using the mouse, etc. The control section 40 calculates a scale factor corresponding to the scaling operation performed by the user through the operation section 47, and stores it in the temporary storage area 42.

The auxiliary storage section 48 is a device using a disk drive for realizing reading of data from the storage medium 49. The control section 40 is capable of reading the control program 4P stored in the storage medium 49 by the auxiliary storage section 48 and storing it in the storage section 41. Moreover, the control section 40 is capable of reading the code book stored in the storage medium 49 and the corresponding contour vector information, and storing them in the storage section 41. The above-mentioned control program 4P, code book, or contour vector information stored in the storage section 41 may be read from the storage medium 49 and stored through the auxiliary storage section 48, or may be stored beforehand.

When displaying the selected image on the display 45 by reading the control program 4P from the storage section 41 into the temporary storage area 42 and executing it, the control section 40 performs the following processes.

When expanding the selected image to the temporary storage area 42, the control section 40 encodes the image by using a vector quantization technique. As shown in the explanatory view of FIG. 3 of Embodiment 1, the control section 40 encodes the selected image on a block-by-block basis, each block consisting of 4×4 pixels. The control section 40 performs an encoding process using a vector quantization technique, which reduces the amount of data by referring to the code book in the storage section 41 for each block, searching for a pixel pattern having the highest correlation with a pixel pattern appearing in a block, and replacing the pixel pattern with the index value of the searched pixel pattern.

The control section 40 stores the encoded index image in the temporary storage area 42. Since the image is expanded in the form of the index image, it is possible to reduce the ratio of used temporary storage area 42.

Next, when displaying the image by a scale factor calculated according to the scaling operation performed by the user, the control section 40 decodes the image on a block-by-block basis, each block consisting of 4×4 pixels, by using a vector quantization technique and performs the resolution conversion process according to the scale factor. As shown in the explanatory view of FIG. 3 of Embodiment 1, the control section 40 reads a pixel pattern corresponding to an index value indicated by the index image stored in the temporary storage area 42 from the code book in the storage section 41, and performs the resolution conversion process on the pixel pattern according to the scale factor.

The details of the resolution conversion process are realized by the control section 40 executing the processing steps shown in the flowchart of FIG. 10 of Embodiment 1 for each pixel pattern.

The control section 40 successively decodes the index images, and inputs the image obtained as a result of performing the resolution conversion process into the image display section 44. After performing predetermined processing on the decoded image written into the image memory 43 by the image display section 44, the image is outputted to the display 45 by the image display section 44 and displayed according to a scale factor desired by the user.

While displaying the selected image in the display application, the control section 40 stores the index image in the temporary storage area 42. Whenever the operation section 47 detects the scaling operation performed by the user, the control section 40 calculates a scale factor corresponding to the scaling operation, and decodes the index image and performs the resolution conversion process as described above according to the calculated scale factor. Hence, whenever the scaling operation is performed, it is possible to execute the resolution conversion process while decoding the index image and realize multi-scalable drawing at high speed, without detecting contours and calculating smoothed contour vectors.

In Embodiment 4, although the control section 40 executes the respective processes based on the control program 4P stored in advance in the storage section 41, the control section 40 can be a microcomputer incorporating a ROM in which the control program 4P is stored in advance. Regarding the code book and the contour vector information, they can also be stored in the ROM incorporated into the microcomputer.

The image processing apparatus 4 of Embodiment 4 is constructed as a display apparatus comprising the image display section 44 and the display 45 and capable of displaying an image by smooth drawing by outputting the decoded and scaled image data to the display 45 by the image display section 44. However, this embodiment is not limited to this, and it is possible to construct the image processing apparatus so that the decoded and scaled image data, which is expanded into the image memory 43, is outputted to the printer etc. by the CPU.

The storage medium 49 is a storage medium removable from the image processing apparatus 4, and can be a tape such as a magnetic tape and a cassette tape; a magnetic disk such as a flexible disk and a hard disk; an optical disk such as a CD-ROM, an MO, an MD and a DVD; a card such as an IC card (memory card) and an optical card; and a semiconductor memory such as a mask ROM, an EPROM, an EEPROM, and a flash ROM, and stores the control program 4a in a fixed manner. Accordingly, the auxiliary storage section 48 can be an apparatus capable of reading the control program 4P from a tape, a magnetic disk, an optical disk, a card, or a semiconductor memory.

The image processing apparatus 4 of Embodiment 4 comprises the communication section 46 and is capable of communicating data with an external apparatus through a network. Thus, the control section 40 can download the control program 4P from an external apparatus through the communication section 46 and store it in the storage section 41. Similarly, the control section 40 can download the code book or the contour vector information from the external apparatus through the communication section 46 and store it in the storage section 41. In the case where the control program 4P, code book, or contour vector information is downloaded from an external apparatus through the network, a downloading program can be stored in the storage section 41 in advance, or a downloading program stored in the storage medium 49 can be read by the auxiliary storage section 48 and then stored in the storage section 41. This embodiment can also be realized in a mode in which the above-mentioned control program 4P is embodied by electronic transfer of a computer data signal embedded in a carrier wave.

Note that the structure of embodying the present invention by software is also applicable to the display apparatus 2 of Embodiment 2 and the image forming apparatus 3 of Embodiment 3. In this case, the structure can be realized without the codec circuit 1 by designing the computer program 4P stored in the ROM of the display apparatus 2 or the image forming apparatus 3 to direct the CPU to execute the image processing method according to this embodiment.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
   a storage section for storing a plurality of different pixel patterns, indices indicating the respective pixel patterns, and contour vector information indicating contours appearing in the pixel patterns in association with each other;
   a decoding section for decoding image data, which has been encoded by replacing an image composed of a plurality of pixels on a block-by-block basis, each block consisting of a predetermined number of pixels, with any of the pixel patterns and representing the pixel patterns by the indices, on the block-by-block basis by referring to the storage section and using a pixel pattern indicated by an index representing the image data; and
   a scaling section for scaling a pixel pattern used for each block to be decoded by said decoding section and redrawing pixels near a contour in the pixel pattern after scaling by using the contour vector information corresponding to the pixel pattern, wherein said scaling section calculates a line segment vector corresponding to a contour according to a scale factor by using the contour vector information corresponding to an index representing the image data, and corrects pixel values of pixels near the contour after scaling the pixel pattern corresponding to the index so that the pixel values gradually decrease or increase according to distances from the line segment vector.

2. The image processing apparatus according to claim 1, wherein said scaling section calculates the distance by using an absolute value of an outer product of the line segment vector and a vector from a starting point of the line segment vector to a position of a pixel near the contour.

3. The image processing apparatus according to claim 1, wherein said scaling section determines whether a pixel near the contour is located inside or outside an area having the line segment vector as the contour, based on a sign of an outer product of the line segment vector and a vector from a starting point of the line segment vector to a position of the pixel near the contour.

4. The image processing apparatus according to claim 1, wherein said scaling section determines whether a correction to be made to a pixel near the contour based on the line segment vector is effective or ineffective by using an inner product of the line segment vector and a vector from a starting point of the line segment vector to the pixel near the contour, and corrects the pixel value of the pixel near the contour based on the distance from the line segment vector when determined that the correction is effective.

5. An image display apparatus comprising:

an image processing apparatus defined in claim 1; and an image display section for displaying an image outputted from said image processing apparatus.

6. An image forming apparatus comprising:

an image processing apparatus defined in claim 1; and an image forming section for forming an image outputted from said image processing apparatus.

* * * * *